(12) United States Patent
Ravinathan et al.

(10) Patent No.: US 12,536,538 B2
(45) Date of Patent: Jan. 27, 2026

(54) METHOD AND SYSTEM FOR PAYMENT DEVICE-BASED ACCESS

(71) Applicant: Mastercard Asia/Pacific PTE. LTD., Singapore (SG)

(72) Inventors: Srinath Ravinathan, Singapore (SG); Donghao Huang, Singapore (SG); Dendy Gunawan, Singapore (SG); Karl Cheng, Singapore (SG); Hancong Guan, Singapore (SG); Phuoc Hoang Long Le, Singapore (SG)

(73) Assignee: Mastercard Asia/Pacific PTE. LTD., Singapore (SG)

(*) Notice: Subject to any disclaimer, the term of this patent is extended or adjusted under 35 U.S.C. 154(b) by 103 days.

(21) Appl. No.: 17/949,187

(22) Filed: Sep. 20, 2022

(65) Prior Publication Data

US 2023/0092733 A1    Mar. 23, 2023

(30) Foreign Application Priority Data

Sep. 21, 2021 (SG) .......................... 10202110431Q

(51) Int. Cl.
*G06Q 20/40* (2012.01)
*G06Q 20/38* (2012.01)

(52) U.S. Cl.
CPC ..... *G06Q 20/4014* (2013.01); *G06Q 20/3827* (2013.01); *G06Q 2220/00* (2013.01)

(58) Field of Classification Search
None
See application file for complete search history.

(56) References Cited

U.S. PATENT DOCUMENTS

| 4,293,053 A | 10/1981 | Shuttleworth et al. |
| 5,581,054 A | 12/1996 | Anderson et al. |

(Continued)

FOREIGN PATENT DOCUMENTS

| WO | 2012027585 A1 | 3/2012 | |
| WO | WO-2012027585 A2 * | 3/2012 | ............. G06Q 20/02 |

OTHER PUBLICATIONS

International Search Report and Written Opinion, PCT/US2021/053879, dated Dec. 16, 2021, pp. 1-8.

(Continued)

*Primary Examiner* — Eduardo Castilho
(74) *Attorney, Agent, or Firm* — Pramudji Law Group PLLC; Ari Pramudji

(57) ABSTRACT

An access control method comprises: providing access profiles for users, wherein each access profile comprises an access profile identifier and at least one personal identifier mapped to one or more obfuscated payment numbers, and wherein each of the at least one personal identifiers is a non-payment identifier issued by an identity provider; receiving, from a terminal of a service provider, a request to validate permission for a user of a payment device to access a resource made available by the service provider, the request comprising an obfuscated payment number read by the terminal from the payment device; determining whether there is a match of the obfuscated payment number read by the terminal and one of the obfuscated payment numbers of the access profiles; and transmitting at least one of the identifiers of the matched access profile to the service provider for matching to a stored identifier associated with the resource.

17 Claims, 24 Drawing Sheets

(56) References Cited

U.S. PATENT DOCUMENTS

| | | | |
|---|---|---|---|
| 5,596,501 | A | 1/1997 | Comer et al. |
| 7,096,494 | B1 | 8/2006 | Chen |
| 8,086,533 | B1 | 12/2011 | Maglaque et al. |
| 10,200,359 | B1* | 2/2019 | Sokolov .............. H04L 63/0853 |
| 10,210,509 | B2 | 2/2019 | Acosta |
| 10,963,871 | B2* | 3/2021 | Safak ................. G06Q 20/3223 |
| 11,398,123 | B1 | 7/2022 | Mars et al. |
| 2002/0078569 | A1 | 6/2002 | Buge et al. |
| 2002/0125067 | A1 | 9/2002 | Porte et al. |
| 2006/0016878 | A1 | 1/2006 | Singer et al. |
| 2008/0189772 | A1* | 8/2008 | Sims ..................... G06F 21/445 726/5 |
| 2008/0201212 | A1 | 8/2008 | Hammad |
| 2009/0125446 | A1* | 5/2009 | Saunders ............. G06Q 20/327 705/67 |
| 2010/0199089 | A1* | 8/2010 | Vysogorets ............. G06F 21/34 713/168 |
| 2012/0008775 | A1* | 1/2012 | Natarajan ............. H04W 12/06 380/247 |
| 2012/0109368 | A1* | 5/2012 | Canter ................ G06Q 20/387 705/347 |
| 2012/0130536 | A1* | 5/2012 | Canter ................... G06Q 20/18 700/237 |
| 2012/0330839 | A1 | 12/2012 | Kavanagh et al. |
| 2013/0151418 | A1* | 6/2013 | Licciardello ....... G06Q 20/1085 705/72 |
| 2013/0304648 | A1 | 11/2013 | O'Connell et al. |
| 2013/0332344 | A1* | 12/2013 | Weber ................. G06Q 20/385 705/39 |
| 2014/0115694 | A1 | 4/2014 | Fadell et al. |
| 2015/0012434 | A1 | 1/2015 | Aabye et al. |
| 2015/0213433 | A1* | 7/2015 | Khan ................ G06Q 20/3829 705/71 |
| 2015/0282261 | A1 | 10/2015 | Recker et al. |
| 2015/0348043 | A1 | 12/2015 | Leger |
| 2016/0005041 | A1* | 1/2016 | Reiskind ............. G06Q 20/383 705/64 |
| 2016/0117874 | A1 | 4/2016 | Daniel-Wayman et al. |
| 2016/0148195 | A1 | 5/2016 | Acosta |
| 2016/0155279 | A1 | 6/2016 | Thomas et al. |
| 2016/0358175 | A1 | 12/2016 | Weller et al. |
| 2017/0068960 | A1* | 3/2017 | Kwak .................. G06Q 20/405 |
| 2017/0140347 | A1 | 5/2017 | Berman et al. |
| 2017/0161861 | A1 | 6/2017 | Hong |
| 2018/0033227 | A1 | 2/2018 | Gokcebay |
| 2018/0211462 | A1 | 7/2018 | Wendling et al. |
| 2018/0232716 | A1 | 8/2018 | Confoti |
| 2018/0349907 | A1 | 12/2018 | Dixon |
| 2019/0005496 | A1* | 1/2019 | Noe ..................... G06Q 20/227 |
| 2019/0066090 | A1 | 2/2019 | Mei |
| 2020/0286061 | A1 | 9/2020 | Wang |
| 2020/0286077 | A1 | 9/2020 | Beman et al. |
| 2021/0150824 | A1 | 5/2021 | Goel |
| 2021/0359856 | A1* | 11/2021 | Shankar ................. G06Q 20/32 |
| 2021/0383387 | A1* | 12/2021 | Ratica .................. G06Q 20/389 |
| 2021/0398123 | A1 | 12/2021 | Snehasri et al. |
| 2022/0006636 | A1* | 1/2022 | Patterson .............. H04L 63/083 |

OTHER PUBLICATIONS

Bamasoud, Doaa M., et al. "An Explorative Study for Laundry Mobile Applications." International Journal of Advanced Computer Science and Applications 9.4 (2018).

Gupta, Akanksha, et al. "Development of mobile application for laundry services using android studio" International Journal of Applied Engineering Research; India (2018).

Mei, Leong Yi, et al. "LaundryMama: Humanising Laundry Tasks using Laundry Management System and Laundry-On-Demand Mobile Applications"; IOP Conference Series: Materials Science and Engineering; vol. 767; No. 1; IOP Publishing 2020.

* cited by examiner

METHOD AND SYSTEM FOR PAYMENT DEVICE-BASED ACCESS

TECHNICAL FIELD

The present disclosure relates to methods and systems for payment device-based access, for example access to physical environments, electronically locked storage compartments, or unattended retail devices such as vending machines.

BACKGROUND

Smart cards having contactless (near-field communication, NFC) capability are frequently used as access tokens for physical environments such as transit terminals, office and apartment buildings, and the like. Typically, a card reader is provided at a barrier, such as a gantry or door, at an entrance of such an environment. An authorized user is provided with a specially-programmed smart card that can be tapped on or waved near the card reader to cause an actuator to which the card reader is coupled to open the barrier for access.

A problem with the above type of access card is that it requires expensive special-purpose card writers for provisioning. Additionally, such access cards may employ varying data formats or standards, or read/write access may be restricted to a single entity (e.g., security management for the building or transit terminal) for security purposes, such that a different access card may be required for every different type of access required by the user.

Another type of well-known smart card is a contactless payment card or other payment device, such as a contactless fob or a payment-enabled smartphone or other mobile device. The most commonly encountered type of contactless payment device operates according to the EMV contactless specification. Other types of contactless payment card are also known.

EMV cards are payment-specific, and cannot be used for access without expensive EMV-certified terminals being provided as card readers.

It is desirable therefore to overcome or alleviate one or more of the above difficulties, or at least to provide a useful alternative.

SUMMARY

The present disclosure relates to an access control method comprising:
  maintaining access profiles for users, each access profile comprising an access profile identifier and at least one personal identifier that is mapped to one or more obfuscated payment numbers, wherein the or each personal identifier is a non-payment identifier that is issued by an identity provider;
  receiving, from a terminal of a service provider, a request to validate permission for a user of a payment device to access a resource made available by the service provider, the request comprising an obfuscated payment number read by the terminal from the payment device;
  determining whether there is a match of the obfuscated payment number read by the terminal to one of the obfuscated payment numbers of one of the access profiles; and
  responsive to a positive determination, returning at least one of the identifiers of the matched access profile to the service provider for matching to a stored identifier associated with the resource, to thereby enable access to the resource.

The present disclosure also relates to an access control server comprising:
  a data store that stores access profiles for users, each access profile comprising an access profile identifier and at least one personal identifier that is mapped to one or more obfuscated payment numbers, wherein the or each personal identifier is a non-payment identifier that is issued by an identity provider; and
  an access validation module that is configured to:
    receive, from a terminal of a service provider, a request to validate permission for a user of a payment device to access a resource made available by the service provider, the request comprising an obfuscated payment number read by the terminal from the payment device;
    query the data store to determine whether there is a match of the obfuscated payment number read by the terminal to one of the obfuscated payment numbers of one of the access profiles; and
    responsive to a positive determination, return at least one of the identifiers of the matched access profile to the service provider for matching to a stored identifier associated with the resource, to thereby enable access to the resource.

The present disclosure further relates to non-transitory computer-readable storage having stored thereon instructions for causing at least one processor to carry out an access control method as disclosed herein.

BRIEF DESCRIPTION OF THE DRAWINGS

Embodiments of the present invention will now be described, by way of non-limiting example, with reference to the drawings in which.

DETAILED DESCRIPTION

Figure 1:
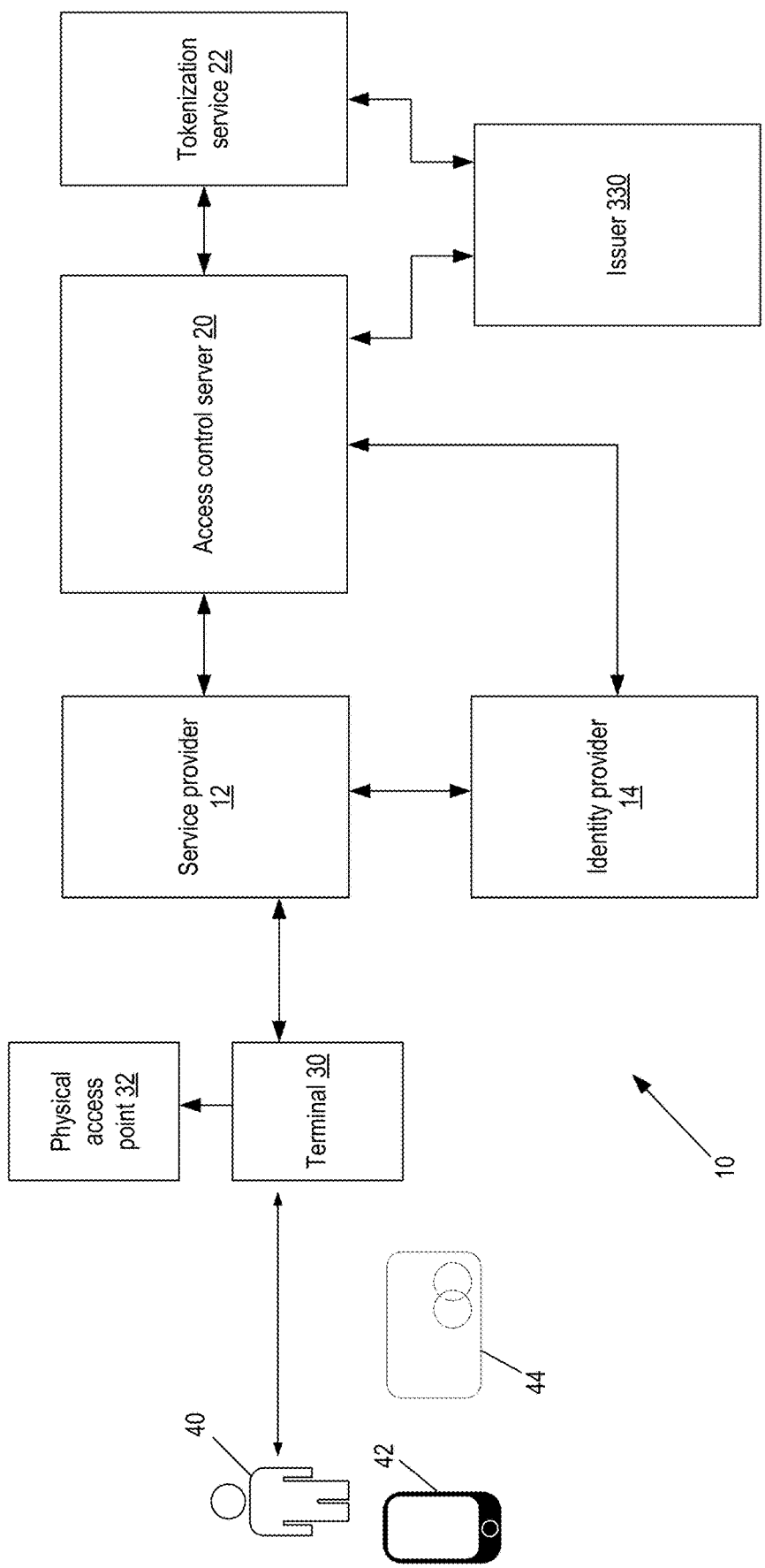
FIG. 1 is an example architecture of an access control system according to embodiments.

In general terms, embodiments of the present invention implement access control systems that maintain associations between payment numbers and personal identifiers that can be used by service providers to provide access to resources that are accessible via physical access points such as unattended retail devices and entrance gates or gantries. This enables standard payment devices, that do not need to be specially programmed for access purposes, to identify users according to their respective personal identifiers, whereby the users are able to access the resources.

An example of such an access control system will now be described with reference to FIGS. 1 and 2. The access control system 10 comprises an access control server 20 which maintains access profiles 220 in an access profile database 210 (FIG. 2) for a plurality of users. Each access profile 220 may be identified by a unique access profile identifier, and represents an association between one or more payment numbers on the one hand, and a personal identifier on the other hand. The personal identifier is issued by an identity provider, which may be an organization such as a government, corporation, or education provider. The personal identifier uniquely identifies an individual to the identity provider.

The personal identifiers are typically non-payment identifiers, such as employee ID or member ID, that would otherwise be encoded on dedicated access cards that are used to access secured physical environments. Other non-payment identifiers may comprise national ID, passport number, driver's license number and the like. While some such non-payment identifiers may not ordinarily be used for access control, in some embodiments, an entity that is responsible for issuing such identifiers may provide, to a service provider that implements the access control, access lists that comprise such identifiers. Examples of this type of scenario will be given below.

The access control server 20 is in communication with at least one service provider system 12. The service provider system 12 may be the system of a merchant, and/or another entity on behalf of which the merchant processes transactions. The entity on behalf of which the merchant processes transactions may operate a physical access point 32 which is accessed by a user 40. The user 40 may use a payment device such as a payment card 44 or a payment-enabled computing device such as a smartphone 42 to interact with terminal 30 that is in communication with the physical access point 32. The interaction between a payment card 44 and the terminal 30 may be either contactless (e.g. NFC) or may involve the user 40 dipping the payment card 44 into a card reader slot of the terminal 30; for a smartphone 42 or other device with a non-card form factor, the interaction is contactless only.

The terminal 30 is operable to control a physical actuation mechanism of the physical access point 32 to enable access. For example, the physical access point 32 may comprise a gantry or automatic door that is unlocked and/or actuated on successful usage of the payment device 42 or 44 at the terminal 30. Alternatively, the physical access point 32 may be an unattended retail device such as a vending machine, and successful usage of the payment device 42 or 44 at the terminal 30 may result in dispensing of a product into a drop tray, or opening of an access door behind which one or more products are locked. In another example, the physical access point 32 may control access to devices in a Pay on Demand system, such as a bicycle share scheme, and successful usage of the payment device 42 or 44 at a terminal 30 may unlock a device of the system (such as a bicycle) to enable it to be used.

In one example, the service provider system 12 may comprise an unattended retail service system such as a network of vending machines 32, and the merchant may process transactions on behalf of the unattended retail service system, such that vending machines 32 in the network need only verify, using terminals 30, that said transactions have occurred prior to dispensing products. Importantly, as will be described below, the terminals 30 need not be fully-certified (and thus expensive) EMV terminals, but need only limited functionality that enables them to perform the necessary verification steps.

Access control server 20 is also in communication with one or more identity provider systems 14. An identity provider may be, for example, a merchant that operates a loyalty scheme or membership scheme; a corporation that issues employee identification; a building manager entity that controls access rights for a building or part of a building; or a government entity that issues national ID cards, passports, driver's licenses, memberships for public resources such as libraries and the like. It will be appreciated that many other types of entity may act as identity providers, and that personal identifiers issued by such entities may, in general, be non-payment identifiers that are indicative of permission to access and/or use a resource controlled by such entities.

As will later be described in further detail, identity providers 14 may enable users 40 to enroll a personal identifier with the access control server 20 such that the personal identifier becomes part of their access profile 220, and thus associated with one or more payment identifiers of payment devices 42 or 44 which they own.

In some embodiments, identity providers 14 may also communicate with service providers 12 to provide access lists thereto, such that service providers 12 are able to verify the entitlement of users 40 to access resources when using their payment devices 42 or 44. For example, a service provider 12 may be an operator of an entertainment attraction in a particular country, to which all citizens have free access. In this case, the identity provider 14 may be the national government, which may provide a list of all valid national IDs to the service provider 12. A citizen user 40 whose national ID (personal identifier) is associated with, for example, their payment card 44 may then gain access in automated fashion (e.g. via a gantry or other access point 32) to the entertainment attraction by presenting the payment card 44 without needing to present their national ID card for manual inspection.

Figure 2:
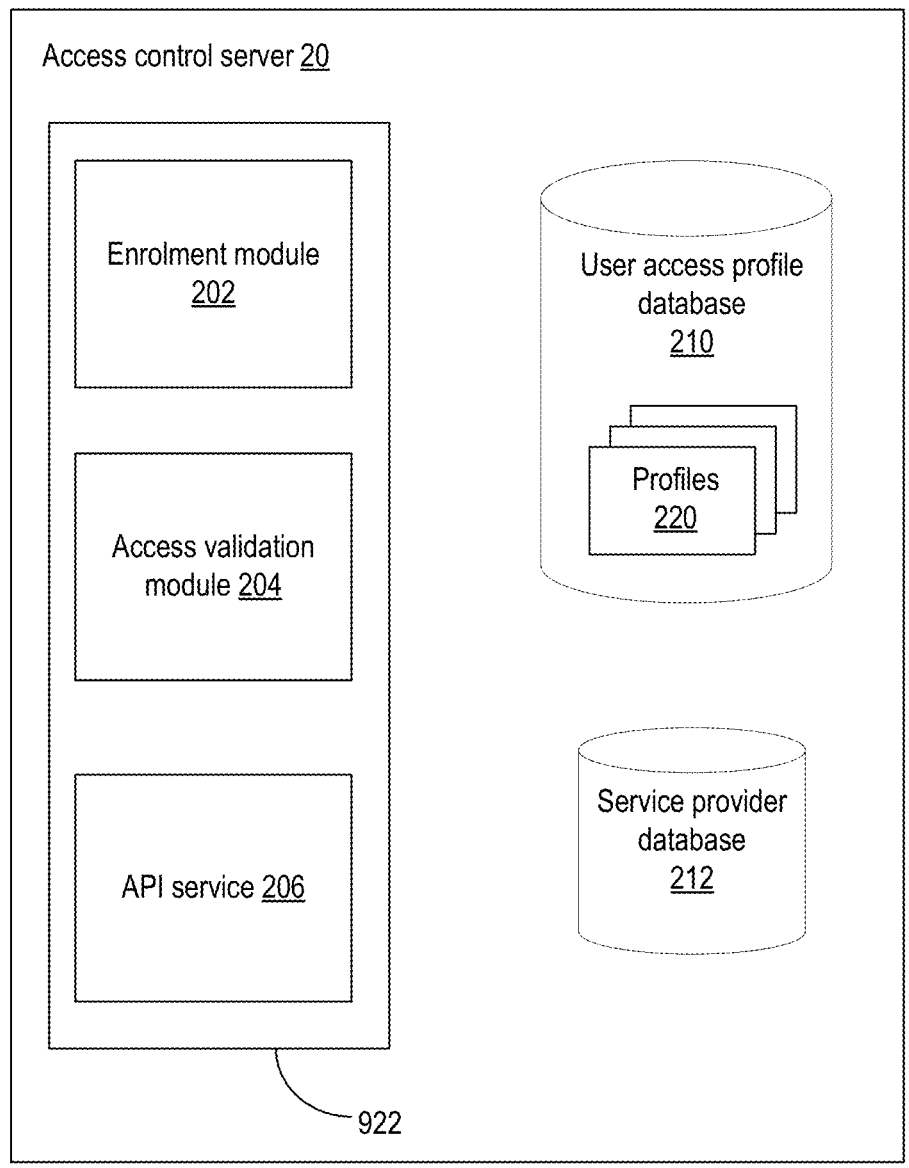
FIG. 2 is an example architecture of an access control server of the access control system of FIG. 1.

As shown in FIG. 1, the access control server 20 may also be in communication with a tokenization service 22 that maintains a mapping between primary account numbers (PANs) and payment tokens. The payment tokens may be device-specific and/or merchant-specific, and may be single-use or limited-use (e.g., limited number of transactions or limited time period over which they may be used). The tokenization service 22, in cooperation with payment card issuers, merchants, and access control server 20, manages the life cycle of payment tokens to which PANs are mapped, including generation of new tokens when a cardholder registers a PAN with a merchant as will be described below.

Figure 3:
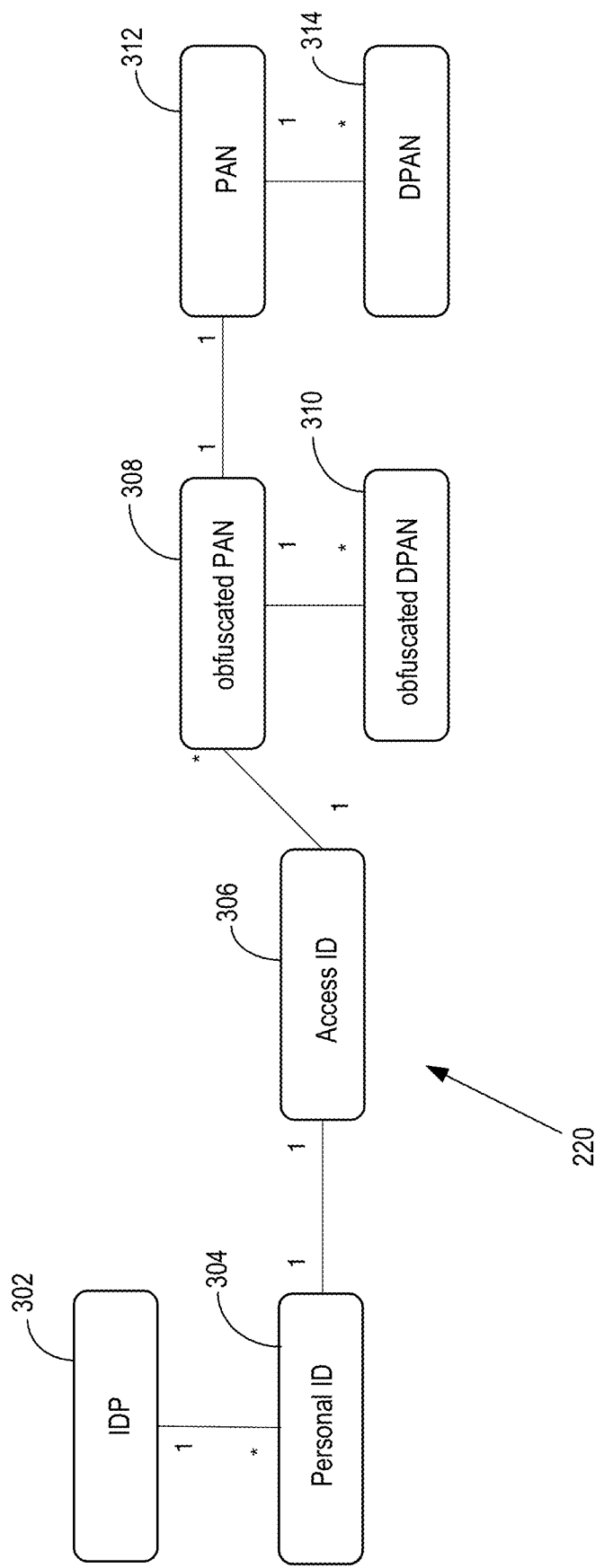
FIG. 3 is a schematic depiction of mappings between different forms of identifiers used by the access control system.

A schematic depiction of a user access profile 220 is shown in FIG. 3. An access profile may be characterized by an access profile identifier 306, which provides a link between a personal identifier 304 issued by an ID provider 14 that has an ID provider identifier 302, and one or more PANs 312. A single access profile identifier 306 is associated with a single personal identifier 304 of a particular identity provider 14, and with a plurality of payment numbers 312, 314.

The personal identifier 304 is a non-payment identifier that uniquely identifies a user in the ID provider's system 14. For example, the ID provider 14 may be a government identity management system, and the personal identifier 304 may be a government-issued ID such as a national ID, a passport number, a driver's license number, or a tax identification number (TIN). In another example, the ID provider 14 may be a central IT system of a University, and the personal identifier 304 may be a student number. In a further example, the ID provider 14 may be a loyalty and rewards system, and the personal identifier 304 may be a loyalty ID.

Each PAN 312 has an obfuscated form 308. The obfuscated PAN 308 may be a hash of the PAN 312, for example. Further, each PAN 312 may be mapped to a plurality of payment tokens 314, referred to in FIG. 3 as DPANs. Each of these payment tokens 314 may also have an obfuscated form 310, which may be a hash of the DPAN 314.

The hash function used to generate the MCID-PAN 308 or MCID-DPAN 310 may be any one of a number of hash functions known in the art. In some embodiments, an integer hash function with collision reduction may be used.

As is evident from FIG. 3, by providing a linkage 306 between personal identifiers that are non-payment identifiers 304 and PAN 312 (and thereby also a linkage between non-payment identifiers 304 and DPANs 314 where there are payment tokens mapped to the PAN 312), a non-payment identifier 304 may be used to identify a cardholder to a terminal 30 when the cardholder presents a payment device that encodes the PAN 312, or one of the DPANs 314, at the terminal 30.

Figure 4:
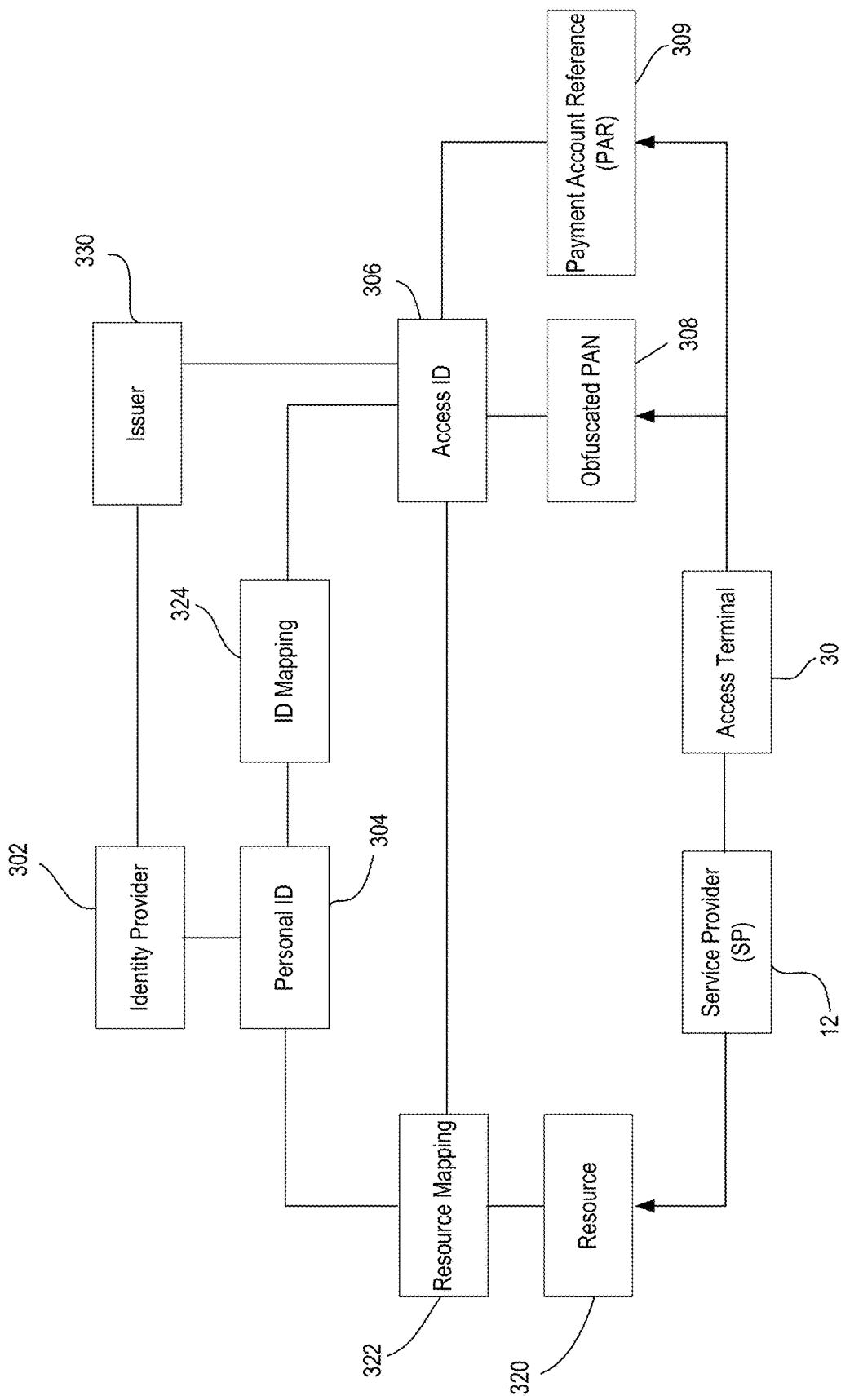
FIG. 4 is an entity diagram showing further details of relationships between entities of the system of FIG. 1, and data used by or generated by those entities as part of an access control process.

FIG. 4 is a consolidated view showing further details of relationships between entities of the system 10 and data used by or generated by those entities as part of an access control process.

As shown in FIG. 4, service provider 12 maintains access to resources 412 to which users having personal identifiers 304 (issued by identity providers 14) are entitled. The entitlement to a resource 320 is managed by way of a resource mapping 322 between the resource 320 and the personal ID 304. The personal ID 304 is in turn mapped to the access profile identifier 306 by an ID mapping 324 at the access control server 20, so that the resource mapping 322 also represents the relationship between the entitlement to the resource 320 and the access profile identifier 306.

The access profile identifier 330 may also be accessible by, or generated in response to a request from, an issuer 330 (typically a bank or other financial institution) that communicates with the identity provider 14. For example, in some embodiments, a holder of a payment card having a PAN 312 may enroll the payment card for use with access control system 10, using a mobile banking application provided by the issuer 330 of the PAN 312. As part of this process the issuer 330 may communicate with the access control server 20 to cause generation of the access profile identifier 306 that is associated with the obfuscated version 308 of the PAN 312.

Also as shown in FIG. 4, terminal 30 associated with service provider 12 may obtain an access profile identifier 306 by transmitting a request that includes an obfuscated form 308 of a PAN 312 (referring back to FIG. 3) and a payment account reference (PAR) 309 that is associated with the PAN 312. The PAR 309 is a non-financial reference (i.e., it cannot be directly used to form a payment authorization request) assigned to each unique PAN and used to link a payment account represented by that PAN to affiliated payment tokens. The PAR 309 has a one-to-one relationship with the PAN 312 and a one-to-many relationship with the payment tokens 314 (as is evident from FIG. 3). It is not possible to reverse engineer the PAN 312 from the PAR 309. In the EMV specification, the PAR 309 is a fixed-length, 29-character uppercase alphanumeric data element that is inserted as EMV tag 9F24 in payment messages.

Figure 5:
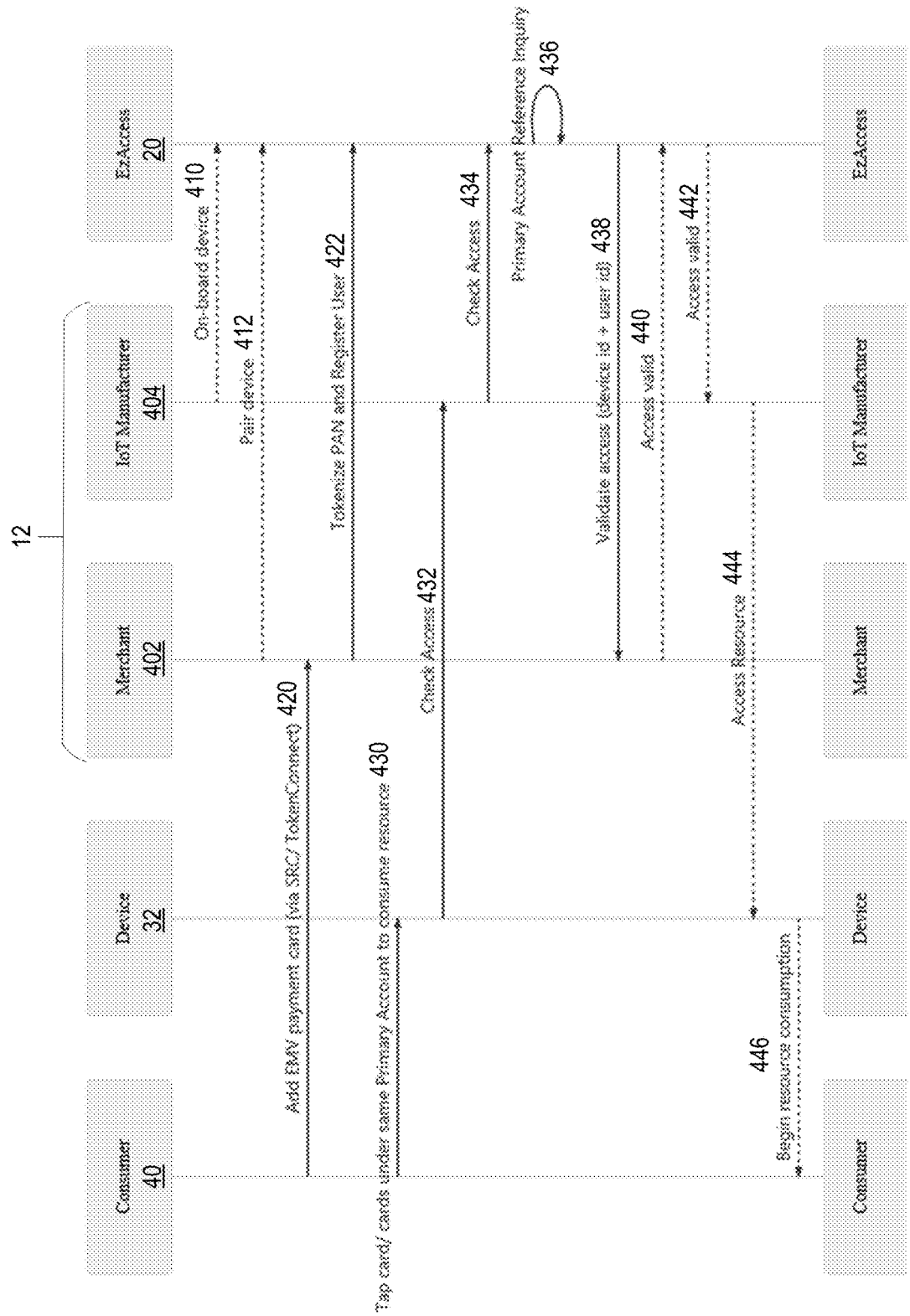
FIG. 5 is a sequence diagram of an enrolment and access control process according to embodiments.

FIG. 5 is a swimlane diagram showing steps in an example of an enrolment and access control process carried out by a user 40 interacting with terminal 30 (not shown in FIG. 5) to access a physical access point in the form of an unattended retail device 32. The unattended retail device 32 is in communication with an Internet of Things (IOT) management system 404. The IOT management system 404 may be the system of a manufacturer of the device 32, for example. IOT management system 404 maintains details of devices 32, which may include, for example, device identifiers, the capability of each device (e.g. whether it is enabled for access only, Pay on Demand, and/or unattended retail), inventory stored by each device, geolocation of each device, and so on.

The IOT management system 404 is in communication with a merchant system 402. Typically, IOT device manufacturers do not have payment processing capability. Nor do they typically want to have such capability, due to the additional technical and compliance burdens that this would entail. As such, an IOT management system 404 of a device manufacturer may integrate with one or more merchants 402 that already have such payment processing capability. In this way, an IOT device manufacturer does not need to provide any payment infrastructure (such as terminals or software), but can simply have the merchant system 402 perform the relevant functions on its behalf. Accordingly, the IOT management system 404 and the merchant system 402 may together be considered to provide the functionality of the service provider 12 of FIG. 1.

The IOT management system 404 may register itself with the access control server 20. For example, the IOT management system 404 may make a registration request via an onboarding function made available via API service 206 of the access control server 20. The onboarding function may take a name of the IOT management system 404, and a URL of a pairing webhook to be used for pairing devices 32 of the IOT management system 404 with the merchant 402, as input. The onboarding function may generate a manufacturer ID for the IOT management system 404, and store this in a service provider database 212 (FIG. 2), as well as storing the URL of the pairing webhook. The manufacturer ID may also be returned to the IOT management system 404.

Similarly, the merchant 402 may register itself with access control server 20 by a call to an onboarding function of API service 206. The onboarding function may take a name of the merchant 402, and a URL of an access request webhook to be used for processing access requests initiated at devices 32 of the IOT management system 404, as input. The onboarding function may generate a merchant ID for the merchant 402, and store this in a service provider database 212 (FIG. 2), as well as storing the URL of the access request webhook. The merchant ID may also be returned to the merchant 402.

The IOT management server also registers one or more devices 32 with the access control server 20 as shown at 410 in FIG. 4. The registration may be via an API call to API service 206. A registration function of API service 206 may take as input an indicator of a capability of device 32 (e.g. access only, pay on demand, and/or unattended retail) and generate as output a device identifier which may also be stored in service provider database 212, or in another database of access control server 20. The device identifier may also be returned to IOT management system 404.

As shown at 412 in FIG. 4, the merchant 402 may make a request to access server 20 to pair (i.e. bind) a device 32 with merchant 402. The request may be via a call to a pairing function of API service 206. The pairing function may take the merchant identifier and device identifier as input. Other inputs may comprise a pairing expiry date and a pairing PIN. The expiry date defines the lease term for which the pairing exists. The pairing PIN enables validation with the IoT management system 404 (if required). The output is a pairing ID that is stored by the access control server 20 and returned to the merchant system 402. The pairing ID represents the relationship between the merchant 402 and the device manufacturer associated with IOT management system 404. This facilitates resource monitoring by the IOT management system 404.

It will be appreciated that the IOT management system 404 and merchant 402 may register and pair multiple devices 32. For example, if IOT management system 404 manages a network of vending machines, each vending machine may be registered with the access control server 20, and paired with the merchant 402.

In the process of FIG. 5, a user 40 may be enrolled with the access control server 20 in a number of ways. FIG. 5 shows an embodiment in which the enrolment is initiated by the service provider 12, via merchant system 402.

For example, as shown at 420, the user 40 may access an enrolment portal via a website of the merchant 402. The enrolment portal may be invoked by the merchant 402 sending a request to enrolment module 202 of access control server 20, for example. The user 40 may manually enter a PAN 312 of a payment card, or a PAN 312 that is a virtual card number (VCN) and thus does not correspond to a physical card but that can still be used for payment transactions. The user 40 may also enter a personal identifier 304 of an identity provider 14 that they wish to be associated with the PAN 312.

In another example, the user 40 may request enrolment of the PAN 312, or a tokenized version 314 thereof, within a secure remote commerce (SRC) framework, via a SRC initiator. The personal identifier 304 may be entered by the user 40 or may be retrieved from the user's SRC profile if it is stored therein.

In a further example, user 40 may request enrolment of a tokenized version of a PAN 312 (a DPAN 314) via a mobile banking application operated by an issuer 330 of the PAN 312. The user 40 may login to the mobile banking application and select a PAN 312 that they wish to map to a personal identifier. The mobile banking application may also enable the user 40 to select a particular personal identifier 304 from a list of available identifiers. On selection of the particular personal identifier 304, the issuer 330 sends a request to access control server 20 to create a mapping between the personal identifier 304 and the PAN. Next, the issuer 330 redirects the user 40 to the identity provider 14 that is the issuer of the personal identifier 304. After the user 40 successfully logs in to the identity provider 14 using the personal identifier 304, the issuer 330, via the mobile banking application, requests tokenization of the PAN 312 (for example, by tokenization service 22). This results in return of a DPAN 314 that is mapped to the PAN 312. The mobile banking application may transmit the DPAN 314 to the merchant system 402 once the user 40 has identified the merchant.

In a yet further example, user 40 may initiate enrolment via a physical terminal, such as terminal 30. The terminal 30 may be associated with a service provider 12 (e.g. merchant 402). In this example, the user 40 may tap a card 44 or other payment-enabled contactless device 42 at the terminal 30, which reads the PAN 312 of the payment-enabled device, and also a PAR 309 if this is stored in the payment-enabled device 42, 44. Terminal 30 or service provider 12 may generate an obfuscated version 308 of the PAN 312, for example by collision-resistant hashing. In some embodiments the terminal 30 may prompt the user 40 to enter a personal identifier that they wish to be associated with the PAN 312. This may be combined with identification data generated by the service provider 12 for submission to the access control server 20 for enrolment. For example, the service provider 12 may generate a user identifier that is assigned to the user, and stored in association with a personal identifier such as the user's driver's license number, passport number, or the like. The user identifier assigned by the service provider 12 may then be sent to the access control server 20 so that the user identifier is associated with the PAN 312.

At 422, the merchant 402 sends a request to the access control server 20 to register the user 40. The request sent to access control server 20 may be by way of an add user function accessible via the API service 206. The request may comprise a merchant ID of the merchant 402, and a payment number. The request may also comprise the personal ID 304 that the user 40 wishes to be associated with the payment number, and an identifier 302 of the identity provider 14 that issued the personal ID 304. The payment number may be a PAN 312, an obfuscated PAN 308, a DPAN 314, or an obfuscated DPAN 310.

In some embodiments, if the merchant 402 is only in possession of the PAN 312 provided by the user 40, the merchant 402 may request tokenization of the PAN 312, for example by making a request to tokenization service 22. The token (DPAN) 314 returned by tokenization service 22 is then sent as the payment number to the access control server 20. When the access control server 20 receives the request, it generates a user access profile identifier 306 and stores this as part of an access profile 220 for the user. The access profile identifier 306 is a value that is stored by the access control server 20, but is not made available to the service provider 12 or the ID provider 14. The access control server 20 also stores an obfuscated payment number (e.g. obfuscated DPAN 310) and the personal ID 304 as part of the access profile 220, so that the obfuscated payment number is associated with the personal ID 304. If a PAR 309 is obtained when reading the payment-enabled device 42 or 44, this may be stored as well as, or instead of, the obfuscated payment number in the access profile 220.

Once the user 40 is registered, the user 40 can use their payment device 42 or 44 to access resources provided via a device 32. As shown at 430 in FIG. 4, the user 40 taps the payment device 42 or 44 at a terminal 30 that is in communication with device 32.

The terminal 30 may be an EMV-lite terminal that is not configured for payment, but is only configured to check the validity of the device 42 or 44 and to confirm the entitlement of the holder thereof to access the resources. For example, the terminal 30 may perform an offline EMV authentication process in the form of a combined data authentication (CDA) process, which is the fastest and most secure way to perform offline card authentication. In other embodiments the terminal 30 may perform a dynamic data authentication (DDA) process. The CDA process or DDA process verifies that the device 42 or 44 has not been tampered with and that the PAN or DPAN is valid. To perform a CDA or DDA, no internet connection is required, and only the public key for the relevant payment card scheme (such as Mastercard) is required, since EMV payment devices are pre-loaded with digitally-signed certificates and keys.

In a CDA process or DDA process, a series of APDU commands are exchanged between the terminal 30 and the device 42 or 44, to cause the device 42 or 44 to generate a signed dynamic cryptogram. The terminal 30 then generates its own dynamic cryptogram using the public key for the relevant card scheme, and checks whether this matches the dynamic cryptogram received from the device 42 or 44. If there is a match, then the terminal 30 generates an obfuscated version 308 of the PAN 312 (or DPAN 314), such as a hash of the PAN 312 as discussed above, and transmits the obfuscated PAN 308 with an access validation request to the device 32. The access validation request may also comprise the payment account reference (PAR) 309 associated with the PAN 312 (or DPAN 314), which is read by the terminal from the payment device 42 or 44.

As shown at 432, the device 32 then transmits an access validation request to the IOT management system 404 of service provider 12. The access validation request comprises the obfuscated PAN 308 (or obfuscated DPAN 310), optionally the PAR 309, and the device ID of device 32. IOT management system 404 then sends, at 434, an access validation request to the access control server 20, for example via API service 206. The request sent to the access control server 20 may comprise the device ID, the obfuscated PAN 308 (310), and the PAR 309 if this is available.

At 436, the access control server 20 receives the access validation request. The access control server 20 may first check whether the obfuscated PAN 308 (or obfuscated DPAN 310) is associated with a user access profile 220. If such a user access profile 220 is located, the access control server 20 retrieves the corresponding personal ID 304.

If the obfuscated PAN 308 (or obfuscated DPAN 310) is unmatched, the access control server may perform a primary account reference (PAR) inquiry using the PAR 309. The PAR inquiry takes the PAR 309 as input and returns a list of all tokens that are associated with the PAR 309. The list may be retrieved from tokenization service 22, for example. The access control server 20 then checks the list of tokens to see if any of them are registered in any user access profiles. If not, an indication that no mapping was found is returned to the terminal associated with device 32, via IOT management system 404. If a token is registered in a user access profile, the corresponding personal ID for the user access profile is retrieved, and the merchant's access validation webhook is called with the device ID and personal ID 304, at 438.

At 440, the access validation webhook of the service provider 12 (which may be implemented by merchant 402) checks, based on the device ID and the personal ID, whether the user has access to a resource that is accessible via the device 32. The check is based on whether the received personal ID matches a personal ID in an access list for the resource and/or for the device 32. The check may further be based on one or more additional criteria, such as whether the user corresponding to the personal ID is permitted to access the resource during a given time period, or whether the user has exceeded a usage limit for the resource.

If the check is successful, this information is provided to access control server 20, which then transmits a success message to service provider 12 (e.g. via IOT management system 404). The service provider 12 further conveys a success message to the device 32 at 444. This allows the user 40 to consume resources at 446, for example by the device 32 causing opening of a gantry or door for access to a physical environment, or dispensing one or more products where the device 32 is a vending machine.

Another embodiment of a user enrolment process that is initiated by an identity provider will now be described with reference to FIGS. 6 and 7. The user enrolment process associates a personal ID 304 with a PAN 312 and possibly also one or more DPANs 314.

Figure 6:
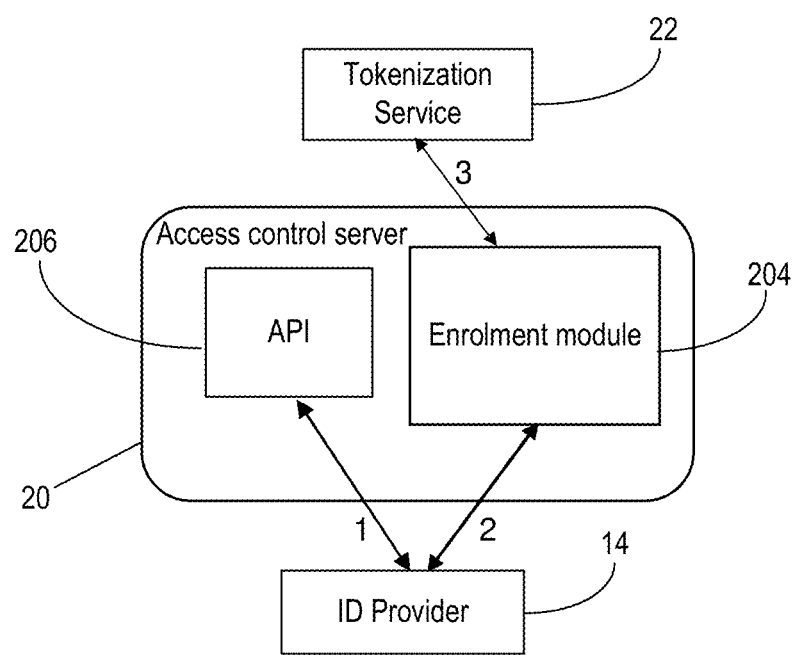
FIG. 6 schematically depicts some data flows between components of the access control system in an example enrolment process.

FIG. 6 schematically depicts a data flow in a user enrolment process that is initiated via an ID provider 14 that is an issuer of the personal identifier 304. The ID provider 14 communicates with the access control server 20, via API service 206, to initiate presentation of an enrolment portal 204 to the user. The access control server 20 also communicates with a tokenization service 22 to retrieve payment tokens that are associated with a PAN or VCN entered by the user.

Figure 7:
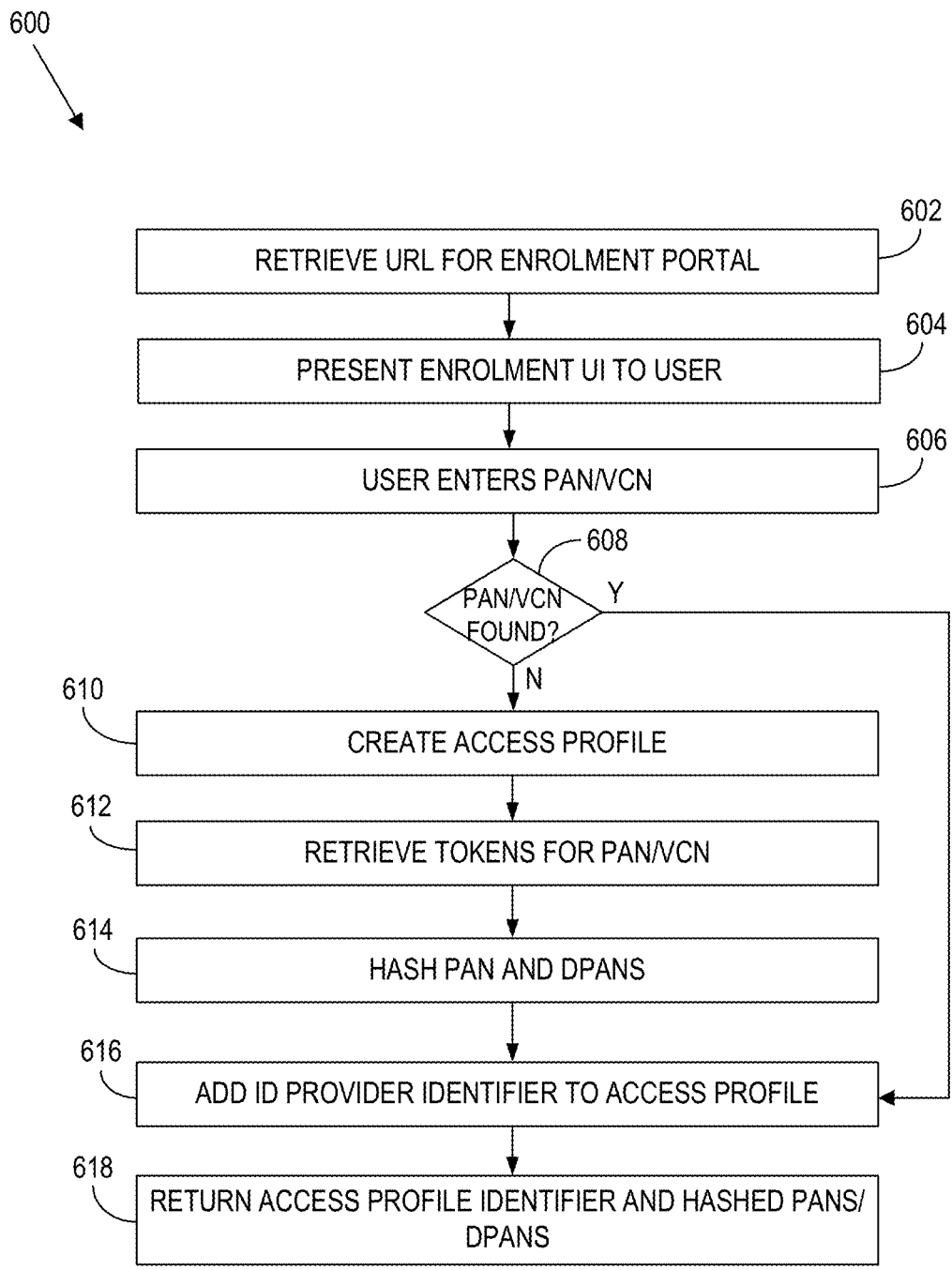
FIG. 7 is a flow diagram of the example enrolment process of FIG. 6.

A flow diagram of an embodiment of the user enrolment process 600 is shown in FIG. 7. At step 602, the ID provider 14 sends an enrolment request to the access control server 20 via API service 206. The enrolment request comprises an identifier of the ID provider 14, and the personal identifier 304 of the user. It is assumed that the user is interacting with, for example, a web server of the ID provider 14, and has logged into an account that they have with the ID provider 14 and that stores the personal identifier 304. In response to the enrolment request, the API service 206 returns a secure URL to an enrolment portal 204. The enrolment portal 204 is a PCI-compliant service which is able to process and store sensitive information such as PANs "in the clear", i.e. without obfuscation.

At 604, the user is redirected to the enrolment portal 204 and an enrolment page is presented. At 606, the user enters their PAN, or in the case of a fully digital card, their VCN, in the enrolment portal 204. In the discussion below, a VCN will be assumed to be equivalent to a PAN for the purposes of describing functionality of embodiments.

At 608, the enrolment portal 204 checks whether an obfuscated version of the PAN or VCN is already enrolled with the access control server 20. To do so, an obfuscated version of the PAN is generated, for example in the same manner as described above by generating an integer hash of the PAN or VCN. The generated value is used to search the access profile database 210 to determine whether the obfuscated PAN is already part of any access profile 220.

Assuming that no corresponding access profile 220 is found, then at 610, a new access profile 220 is created by the enrolment portal 204. The access profile 220 comprises an access profile identifier.

Next, at 612, all payment tokens that are associated with the PAN are retrieved from the tokenization service 22. For example, the tokenization service 22 may search a token vault associated therewith to determine all payment tokens that are mapped to the PAN. Optionally, the access control server 20 may also request that any future mapping of a new payment token to the PAN is notified to the access control server 20 by the tokenization service 22 so that the access control server 20 may add the new payment token to the access profile 220 of the user.

At 614, the payment tokens are returned to the access control server 20, which generates obfuscated DPANs 310 of all token DPANs 314 tied to the PAN 312 (FIG. 3). The obfuscated DPANs 310 are then stored as part of the access profile 220, in association with the access profile identifier. The obfuscated PAN 308 corresponding to the PAN 312 is also stored in the access profile 220.

At 616, the identifier of the ID provider 14 is stored as part of the access profile 220, in association with the access profile identifier, and therefore also the obfuscated PAN 308 and each of the obfuscated DPANs 310 (collectively, the obfuscated PANs).

At 618, the access control server 20 returns the access profile identifier and the obfuscated PANs to the ID provider 14. For example, this may be done by way of a webhook of the ID provider 14 that has previously been registered with the access control server 20. The ID provider 14 then stores the access profile identifier and obfuscated PANs in association with the personal ID of the user.

Referring back to 608, if the obfuscated PAN is already associated with an access profile 220, the relevant access profile 220 is identified and processing goes directly to 616 whereby the identifier of ID provider 14 can be added to the access profile 220.

Once the user has been enrolled via the enrolment process 600, a payment device that encodes the enrolled PAN 312, or one of the DPANs 314 associated therewith, can be used to access resources made available by a service provider 12. The entitlement to access the resources may be associated with the personal ID of the user that is issued by the ID provider 14, and access may be enabled via the access profile identifier that links the user ID and the PAN 312/DPANs 314. An example access control process that makes use of this link will now be described by reference to FIGS. 8 and 9.

Figure 8:
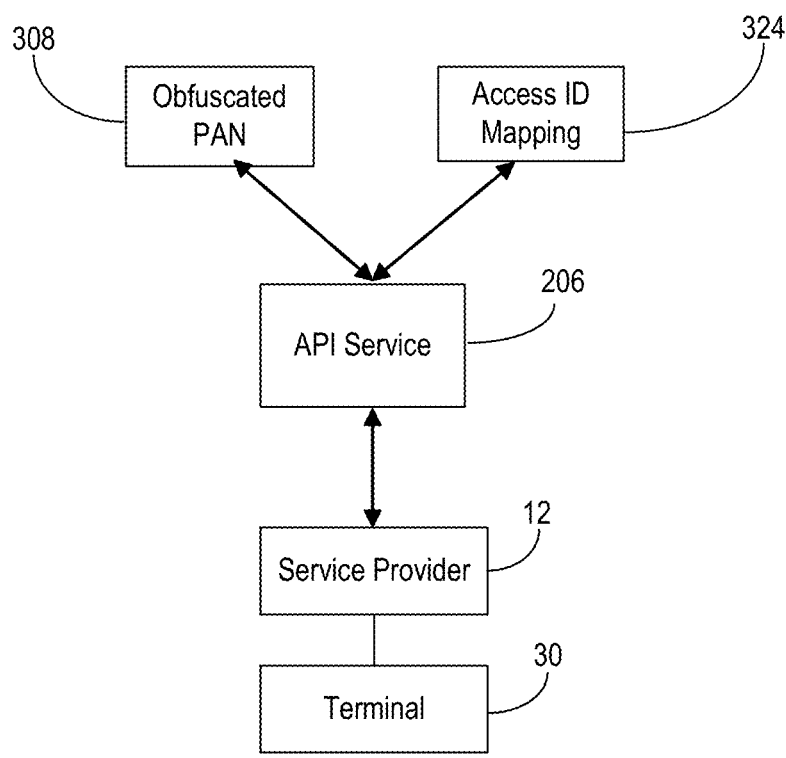
FIG. 8 schematically depicts some data flows between components of the access control system in an example access control process.

As shown in FIG. 8, access is enabled by way of the user interacting, using a payment device 42 or 44, with a terminal 30 that is associated with a physical access point (device 32). The terminal 30 communicates with a service provider system 12. The service provider system 12 is configured to call the API service 206 of access control server 20 to determine, based on an obfuscated version of the PAN or DPAN encoded in the payment device 42 or 44, whether the user is entitled to resources from the service provider 12 and if so, the resources are made available via device 32.

Figure 9:
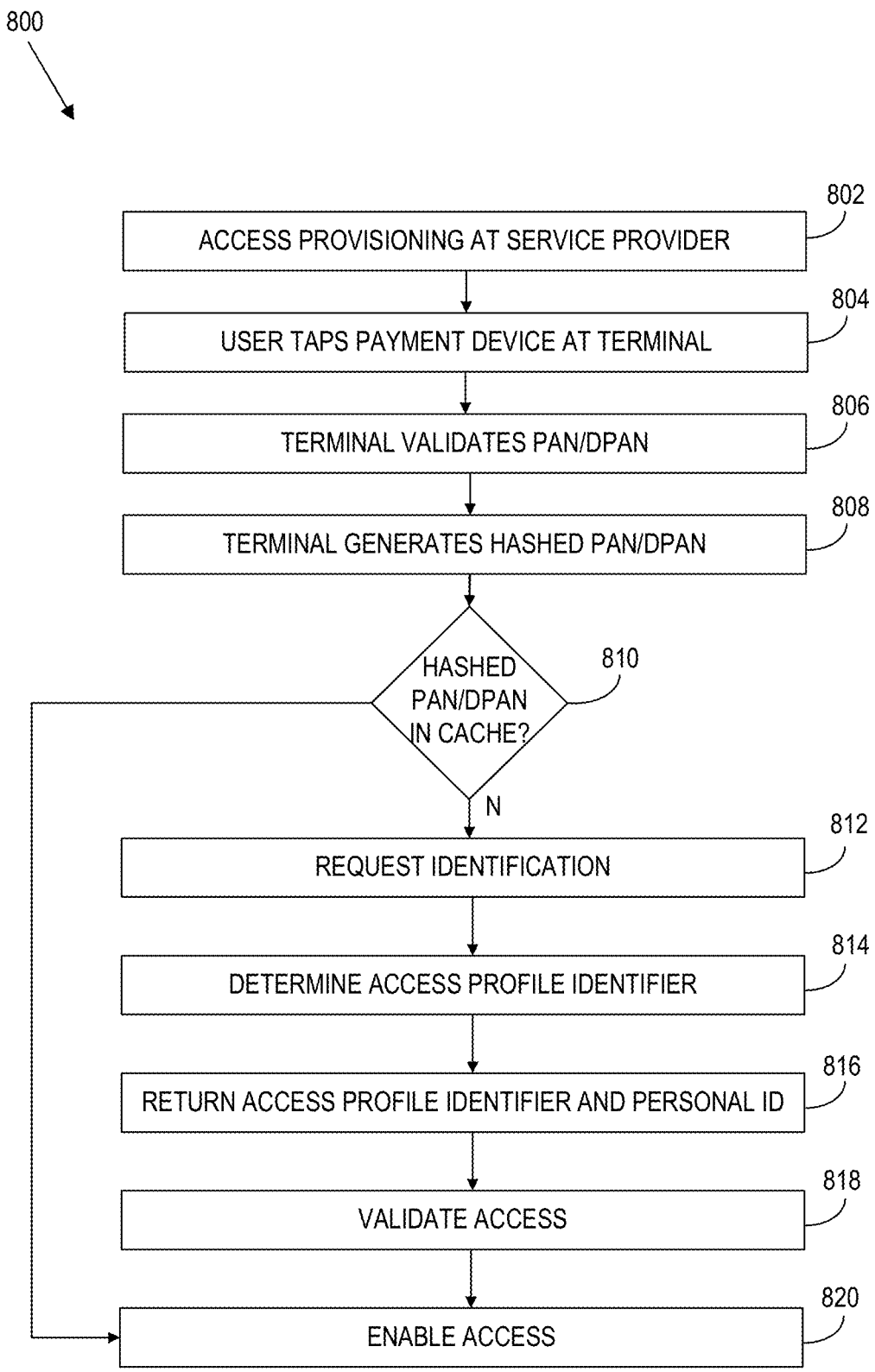
FIG. 9 is a flow diagram of the example access control process of FIG. 8.

An example access control process 800 is shown in FIG. 9. At 802, the service provider 12 provisions access to the user. This may be done in several ways. For example, service provider 12 may receive a list of all access profile identifiers that have been enrolled at ID provider 14, such that any access profile identifier in the list is added to an access list at the service provider 12. In another example, where the service provider 12 is a merchant, the user may make a purchase through the merchant, where the purchase is associated with the personal identifier 304 and the identifier 302 of the ID provider 14, with the purchase details being stored by service provider 14 as part of the access list.

At some later time after access provisioning is complete, at 804 in FIG. 8, the user may tap their payment device 42 or 44 at terminal 30. The terminal 30 reads the PAN or DPAN of the payment device. At 806, the PAN or DPAN is validated by an EMV CDA process as described above.

If the PAN or DPAN is validated, then at 808, the terminal 30 generates an obfuscated version of the PAN or DPAN, such as an integer hash of the PAN or DPAN as described above.

At 810, the terminal 30 transmits the obfuscated PAN or DPAN to service provider 12. The service provider 12 checks whether the obfuscated PAN or DPAN is already in a cache of whitelisted identifiers. The service provider 12 may maintain such a cache in instances where the type of access is unlikely to change over a certain period of time. For example, where the type of access is entry to a secured environment, it will be appreciated that the same type of interaction will happen every time for a given user, such that the obfuscated PAN/DPAN can be reused on each occasion without any further processing steps. On the other hand, where the type of access is to a product or service that has been pre-purchased, it may not be appropriate to cache the obfuscated PAN/DPAN as further steps may be required to validate the type and number of products/services (e.g. items to be dispensed from a vending machine, or tickets to enter an entertainment attraction) to which the user is entitled. It will be appreciated that in some cases, service provider 12 may need to selectively flush the cache, for example when an employee leaves an organization and is no longer entitled to enter a building occupied by that organization.

If service provider 12 determines that the obfuscated PAN/DPAN is in the cache, then processing goes to 820 and a positive validation result is returned to terminal 30 such that access is enabled, for example by actuating device 32 or a component thereof in suitable fashion.

If service provider 12 determines that the obfuscated PAN/DPAN is not in the cache, the processing goes to 812, where identity validation is requested. An identity validation request is sent to API service 206. The identity validation request comprises the obfuscated PAN/DPAN, a terminal ID of terminal 30, and an identifier 302 of an ID provider 14. The identifier 302 of the ID provider 14 is used to specify the type of identity information that is to be used to identify the user.

At 814, the API service 206 of access control server 20 receives the identity validation request. API service 206 then searches for an access profile that matches the obfuscated PAN or DPAN of the payment device that was used at terminal 30. If a match is found, at 816 the corresponding personal identifier 304 is returned to the service provider 12.

At 818, the service provider 12 receives the personal identifier 304. Service provider 12 then checks whether the personal identifier 304 appears in its access list for the resource accessible via physical access point 32, and if appropriate, the number and type of resources associated with the personal identifier 304. If access validation is successful, a success message is returned to terminal 30 to enable access (at 820) to the resources via the physical access point 32.

In one example of the enrolment process 600 and access control process 800, and referring again to FIG. 1, a user 40 may have a national ID issued by a government organization in her home country. The government organization is an ID provider 14. The user 40 may register a PAN of one of her payment cards through the government organization's web portal, as shown in process 600 of FIG. 6. Once registered, user 40 may use the payment card, or a device that encodes a tokenized version of the payment card (such as a smartphone or smartwatch executing a digital wallet application in which the payment card is provisioned), at any service provider 12 that requires the national ID as proof of identity. For example, a library may be a service provider 12, and the user 40 may be able to present the payment card or other payment device at a card reader of the library as proof of identity and thus be able to borrow books. In another example, the library may have an access gantry for which a smartcard encoding the national ID is required to access. In this case, the payment card or other device may be presented at the access gantry (which plays the role of terminal 30/physical access point 32), and the identity of the user 40 can be validated by the service provider (library) 12 following the process 800 of FIG. 8.

In another example, the same user 40 may visit another country in which tourists may obtain access to certain entitlements by registering with the tourist board of the country. In this case, the tourist board is the ID provider 14, and one or more tourist attractions may be service providers 12. The user 40 may create an account with the tourist board, thereby generating a personal ID in the form of a visitor ID. As part of account creation, the user 40 may also elect to register the PAN of her payment card to enable this to be used to identify her. User enrolment then proceeds as in process 600 of FIG. 6. The user 40 may then visit a free attraction, access to which is restricted by a gantry (terminal 30/physical access point 32). The operator of the free attraction is a service provider 12. The user 40 may tap her payment card or other device (smartphone, smartwatch, fob, etc.) at the gantry, which reads the PAN from the payment card or other device and requests access validation as in process 800 of FIG. 8, enabling access when the association between the visitor ID and the (obfuscated) PAN is detected. Later, the user 40 may use the visitor ID to login to a vending application that is operated by another service provider 12, and to purchase one or more items for later collection. The vending application may identify one or more nearby unattended retail devices 32 from which the purchased items may be collected, and the service provider 12 may store the visitor ID and the details of the purchased items in its access list. Then, when the user 40 presents her payment device at the unattended retail device 32, a terminal 30 of the unattended retail device 32 reads the PAN or DPAN of the payment device and causes the service provider 12 to detect the association between the PAN/DPAN and the visitor ID, thereby identifying the user 40 and her entitlement to the resources provided by the device 32, and providing access to the resources by dispensing the purchased items, following the process 800 of FIG. 8.

Figure 10:
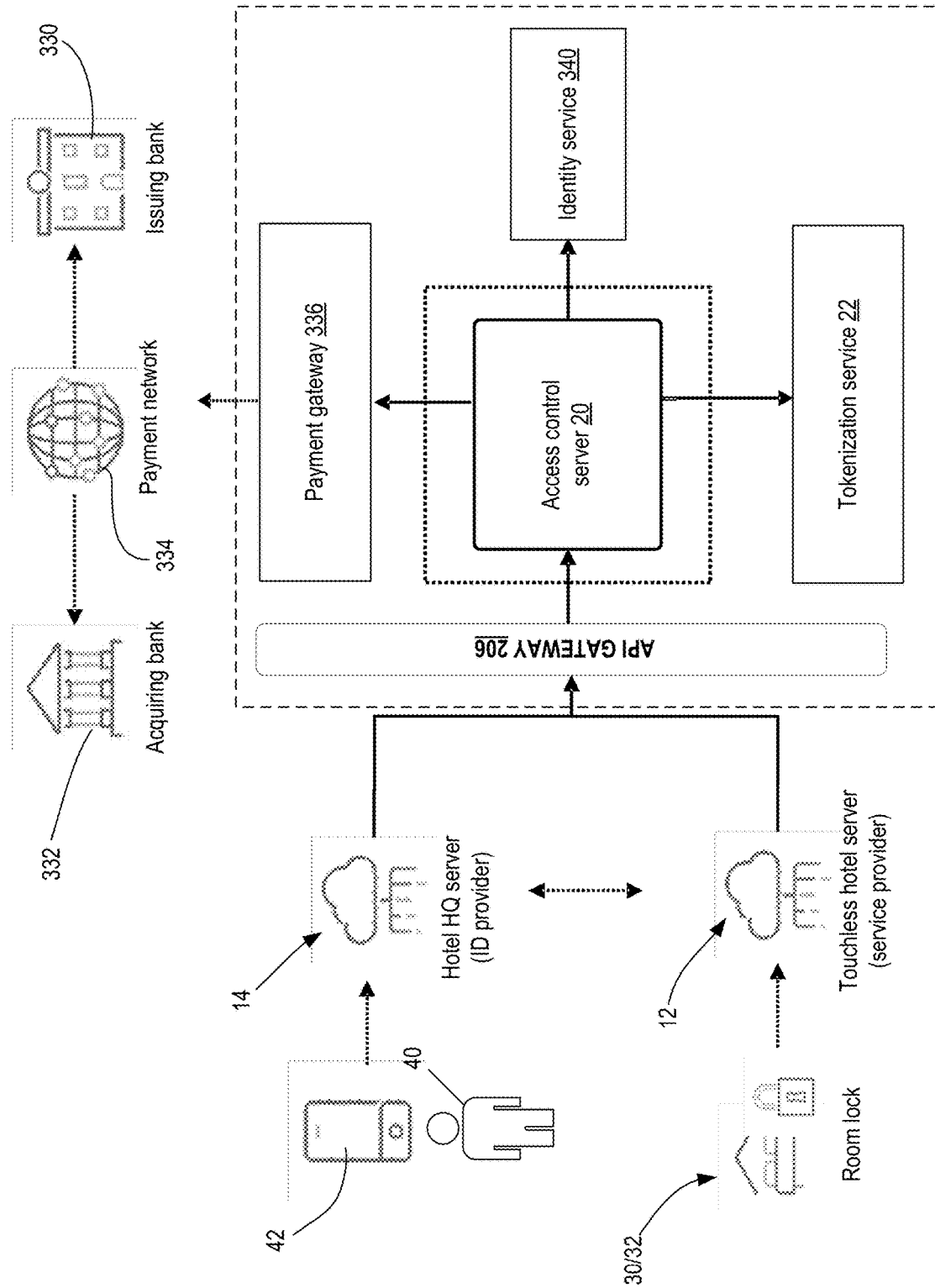
FIG. 10 is an example architecture of an access control system used for touchless hotel booking and room access.

A particular use case will now be described in detail, for illustrative purposes, with reference to FIGS. 10 and 11. FIG. 10 shows an example system architecture of an access control system 1000 that is applicable to hotel room booking and access. The system 1000 is broadly similar to the system 10 of FIG. 1.

In FIG. 10, the ID provider 14 is a central management server of a hotel chain. The ID provider 14 maintains records of users 40 who are registered with a loyalty program of the hotel chain, and each user 40 has a personal identifier in the form of a loyalty identifier. The service provider 12 is a touchless hotel server that communicates with a plurality of door locks 32 of a specific hotel that is part of the chain, each door lock being coupled to a terminal 30. The hotel chain management server 14 and touchless hotel server 12 each communicate with an access control server 20 via an API gateway 206. The access control server 20 is also in communication with computing devices of a number of other services, including a tokenization service 22, an identity service 340, and a payment gateway 336. Payment gateway 336 is further in communication with a payment network 334 that intermediates payment transactions between an acquirer bank 332 (the operator of the hotel's account) and an issuer bank 330 (the issuer of the payment device of the user 40).

Figure 11:
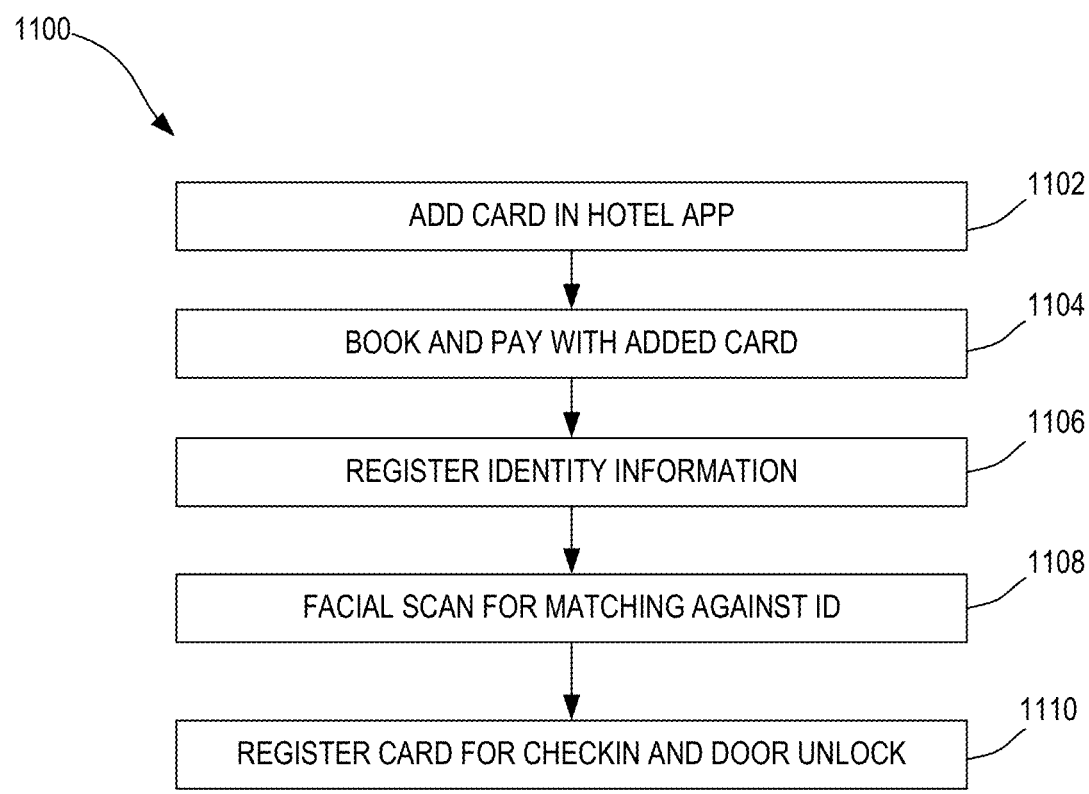
FIG. 11 is a flow diagram of a card enrollment process in the system of FIG. 10.

FIG. 11 is a flow diagram of an example process 1100 for booking and checkin for a hotel room in the system 1000, from the perspective of user 40. At step 1102, the user logs in to a mobile application or website of the hotel chain using their personal identifier (loyalty ID). This causes account details maintained for the user 40 by ID provider 14 to be retrieved. The user 40 can then add a payment card to their account. This may be done by the user 40 entering a PAN of the payment card, or by scanning the card using a camera of the user's mobile device 42. As part of the card enrolment process, central management server 14 may request, via access control server 20, that the PAN be tokenized by the tokenization service 22. The token (DPAN) is then stored in the user's account at the central management server 14.

Next, at step 1104, the user 40 may book a room at a particular hotel of the hotel chain, within the mobile application or website, and using the payment card that has been added to prepay or provide preauthorization for payment for the room. The payment or preauthorization may be initiated by the central management server 14 via API gateway 206, which then causes access control server 20 to send a transaction authorization request to the payment network 334 via the payment gateway 336. On approval of the transaction authorization, the loyalty ID is associated with the payment card that was used to make the booking, so that access provisioning is completed at the touchless hotel server 12 (see 802 of FIG. 9).

Next, at step 1106, the user 40 may initiate checkin within the mobile application, by providing identity information that is required by the hotel. This may be a passport or driver's license, for example. The mobile application may invoke identity service 340 (which may be Mastercard Identity Service, for example) via the API gateway 206, which in turn prompts the user 40 to scan their identity document using the camera of mobile device 42. Once this is done, at step 1108 the identity service 340 may issue a prompt to mobile device 42 to request the user 40 to do a facial scan, so that a real-time selfie with liveness detection can be compared against the photo on the scanned identity document.

Next, at step 1110, the mobile application may enable the user 40 to bind a payment card to their booking so that the payment card can be used to unlock the door 32 of the booked room. For example, the user 40 may select the payment card that was already registered when making the booking, or may add one or more additional cards that they wish to use for door unlock. On selection of the payment card, the mobile application may transmit the selection to central management server 14, which then makes a call via API gateway 206 to enroll the DPAN of the payment card in the user's access profile at access control server 20, in association with the loyalty ID that was used to login to the mobile application. Enrolment may proceed substantially as shown in the enrolment process 600 of FIG. 7, for example.

Once the DPAN is enrolled, the user 40 may use the payment card for which the DPAN was generated to unlock the door 32 of the booked room. The unlocking process may proceed substantially in accordance with the process 800 of FIG. 9. As mentioned above, on booking of the room, access provisioning is complete as the loyalty ID is associated with the payment card used for the booking (step 802). If the user 40 taps the payment card at terminal 30 of door lock 32, the terminal 30 reads the PAN and, if stored in the payment card, the corresponding PAR (step 804) and validates it (step 806). The terminal 30 then generates a hashed PAN and transmits it and, if available, the PAR to the touchless hotel server 12 (step 808). If the touchless hotel server 12 detects that the hashed PAN is already in the access cache for the door lock 32, it may immediately enable access. Otherwise, the touchless hotel server 12 makes a call to the access control server 20 with the hashed PAN and PAR, and the identifier of the ID provider (central management server) 14 (step 812).

The access control server 20 checks whether the hashed PAN of the payment card is enrolled in the user's access profile (step 814). If it is, the loyalty ID is returned and transmitted back to the touchless hotel server 12 (step 816). If a tokenized PAN was enrolled in the user's access profile during enrolment step 1110 of process 1000, then the hashed PAN may not match the user's access profile, since only a hashed DPAN for the payment card will have been stored. In that case, the access control server 20 may perform a PAR inquiry using the received PAR, to retrieve a list of tokens associated with the PAR. These can then be hashed and matched against the stored hashed DPAN in the user's access profile to obtain the loyalty ID that was mapped to the hashed DPAN.

The touchless hotel server 12 can then confirm that the returned loyalty ID matches the loyalty ID that was associated with the payment card during access provisioning (step 818), and return confirmation of this to terminal 30, to cause door lock 32 to unlock (step 820).

The user 40 may also use any other device having a DPAN that is linked to the same PAR. For example, if the payment card is enrolled in a digital wallet on the mobile device 42, the user 40 may tap the mobile device, while the digital wallet is active and the digitized payment card is selected, to cause the terminal 30 to read the DPAN of the digitized payment card, and the PAR which is stored in association with the DPAN by the digital wallet. The terminal 30 then generates a hashed DPAN and causes this and the PAR to be transmitted to the access control server 20 for matching against user access profiles. The hashed DPAN obtained from the wallet is not the same as the hashed DPAN that was generated during enrolment step 1110 of process 1000. However, the access control server 20 can perform a PAR inquiry to obtain other DPANs that map to the same PAR, and generate hashes of these. This will result in generation of a hashed DPAN that matches the hashed DPAN stored in the user's access profile during enrolment step 1110, thus enabling retrieval of the correct loyalty ID for unlocking door lock 32 as above.

Another particular use case will now be described with reference to FIGS. 12 to 17.

Figure 12:
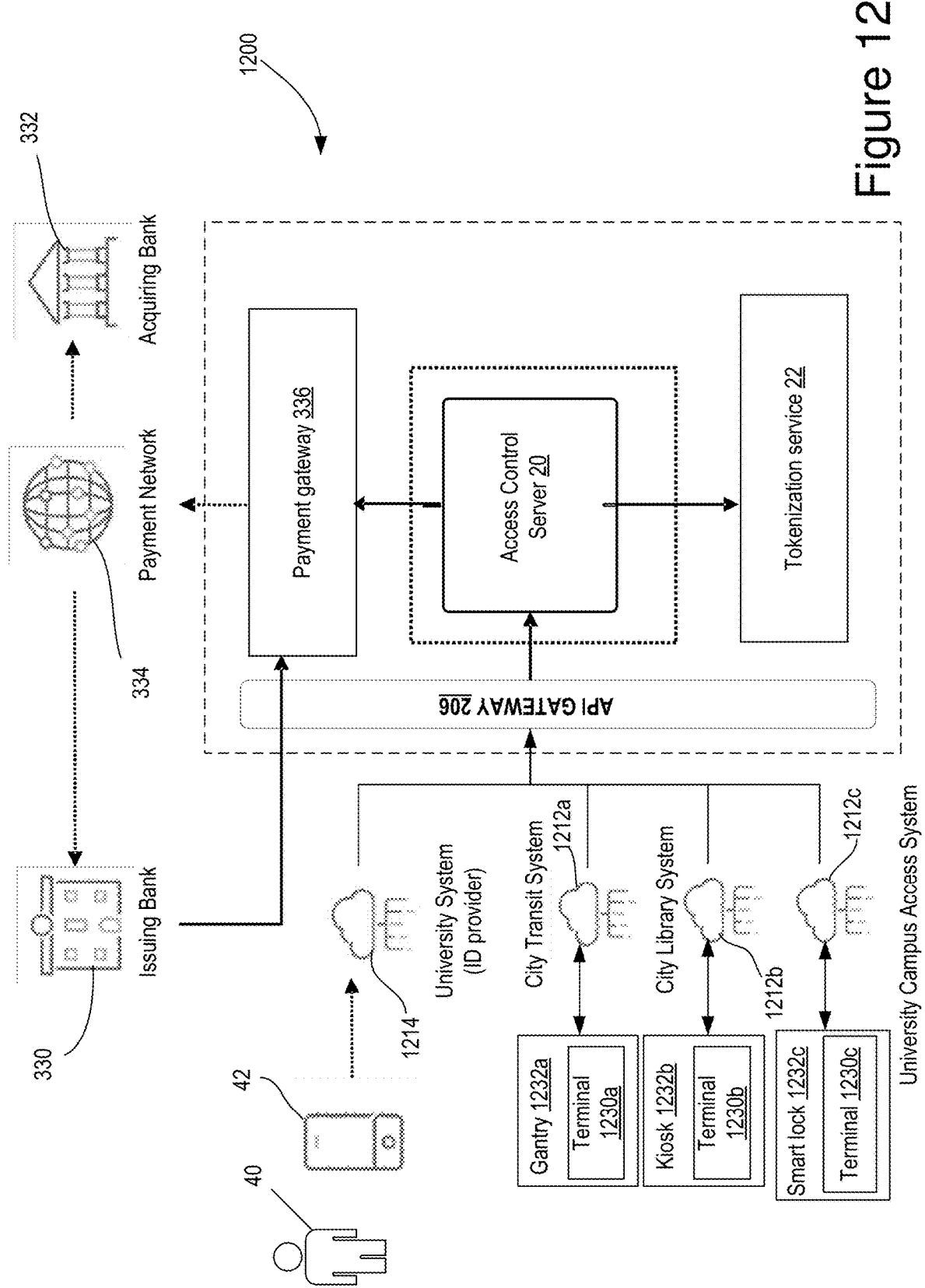
FIG. 12 is an example architecture of an access control system used for touchless access to services on a university campus and external to the university campus.

FIG. 12 shows an example system architecture of an access control system 1200 that is applicable to provision of services to university students. The system 1200 is similar to the system 1000 of FIG. 10, except that in the system 1200, there are multiple service providers each providing different services to users 40 on the basis of them presenting an appropriate personal identifier, in this case a student ID.

The system 1200 comprises access control server 20 as before, communicating with an ID provider that is a university central IT system 1214 via API gateway 206. In the system 1200, there are three service providers: a city transit system 1212*a*, a city library system 1212*b*, and a university campus access system 1212*c*.

The city transit system 1212*a* communicates with gantries 1232*a* to control access to transit terminals by users who tap contactless devices, such as closed-loop contactless ticketing card or standard payment cards, at terminals 1230*a* of the respective gantries.

The city library system 1212*b* communicates with book borrowing kiosks 1232*b* that are equipped with respective terminals 1230*b* for a user to present a contactless device for identification purposes to enable the user to borrow books and other items against their account.

The university campus access system 1212*c* communicates with smart locks 1232*c* that control access to dormitory rooms and other restricted access areas of a university campus. The smart locks 1232*c* are each equipped with a terminal 1230*c* for reading contactless devices for identifying users who are permitted to access the dormitory room or other area.

The university central IT system 1214 may send requests to an issuer 330 to create a student card for user 40. The student card may be a standard payment card having a PAN, but is also associated with a personal identifier in the form of a student ID. Once the student 40 receives the card, they may enroll it for access control via a self-service portal provided by university central IT system 1214. The enrolment process may be similar to the enrolment process 600 of FIG. 6, for example. Following enrolment, the student 40 has a user access profile that comprises an access profile identifier, a personal identifier (the student ID), and an obfuscated PAN (of the student card) that is mapped to the personal identifier.

Figure 13:
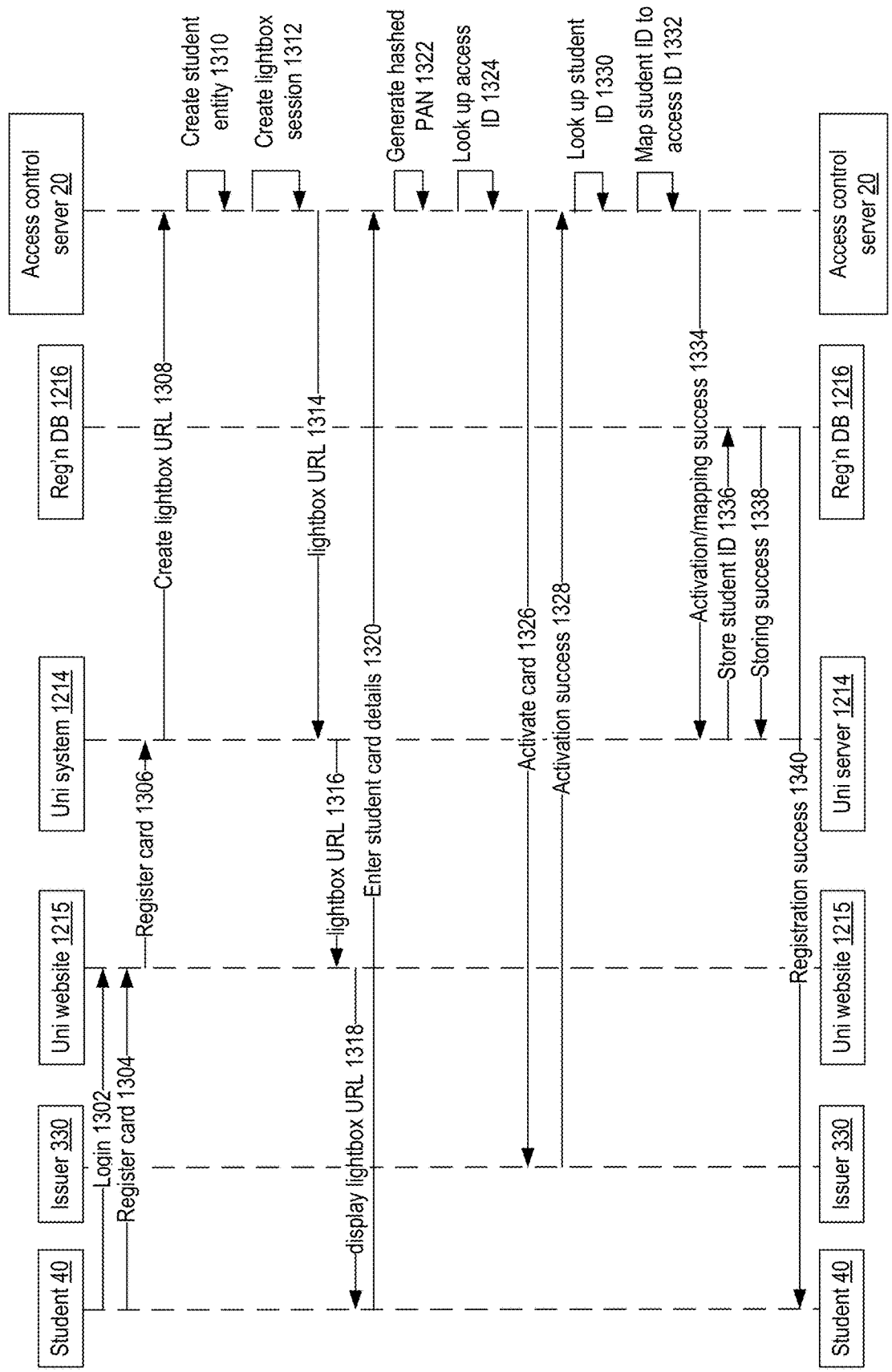
FIG. 13 is an example registration flow for a student registering their student ID for access in the system of FIG. 12.

FIG. 13 shows an example enrolment process for a student user 40 in the system 1200 of FIG. 12. It is assumed that issuer 330 has been onboarded with the access control server 20, and that university central IT system 1214 has been onboarded as an identity provider with access control server 20. Once onboarded, the issuer 330 may periodically upload details of payment-enabled student cards that it issues, to the access control server 20. The details include an obfuscated version of the PAN such as a hashed PAN, the PAR associated with the PAN, and status of the card, for each card. This may cause a user access profile to be created for each student (one profile per student card) at access control server 20. The user access profile at this point comprises an access profile identifier that identifies the user access profile, and the hashed PAN.

The student card enrolment process begins at 1302 by the student 40 logging in to website 1215 provided by the university central IT system 1214, using the student number previously provided to them. At 1304, the student 40 commences a card registration process at website 1215. Website 1215 consequently sends, at 1306, a request to university central IT system 1214 to create a lightbox URL, which is an address of a secure enrolment portal operated by the access control server 20.

At 1308 the university central IT system 1214 makes an API call via the gateway 206 to the access control server 20 for lightbox URL creation. The access control server 20 then creates a user access profile for the student (1310) and creates a lightbox session (1312) having a corresponding lightbox URL and session ID. The lightbox URL (including the session ID) is sent back to the university central IT system at 1314, and on to website 1215 at 1316, so that the lightbox URL can be presented to the device from which student 40 is accessing website 1215 (1318). Typically, the website 1215 will automatically redirect the student 40 to the lightbox URL so that the student 40 can connect to the lightbox session created at 1312.

The lightbox session is a secure, PCI-compliant environment, hosted by the access control server 20, for the student 40 to enter (1320) details of the student card, including the PAN, expiry date, and card verification code (CVC) of the student card. The access control server 20 receives the card details and generates an obfuscated PAN, at 1322. This may be a collision-resistant hash of the PAN and expiry date, for example.

Next, at 1324, the access control server 20 looks up the access profile identifier corresponding to the hashed PAN. This is sent back to the issuer 330 with a request to activate the card (1326). On successful activation by the issuer 330, a confirmation message is sent back to the access control server 20 (1328). Access control server 20 then determines the student ID, using the session ID of the lightbox session (1330). The student ID is then added to the user access profile of the student 40, such that it is mapped to the hashed PAN of the student card and the access profile identifier of the user access profile (1332).

On successful activation and mapping, a confirmation message is sent (1334) from access control server 20 to university central IT system 1214. The confirmation message comprises the student ID, access profile identifier, hashed PAN, and PAR. The university central IT system 1214 stores (1336) these in a registration database 1216, which reports successful storage (1338) so that the university central IT system 1214 can confirm, to student 40, successful registration (1340).

Figure 14:
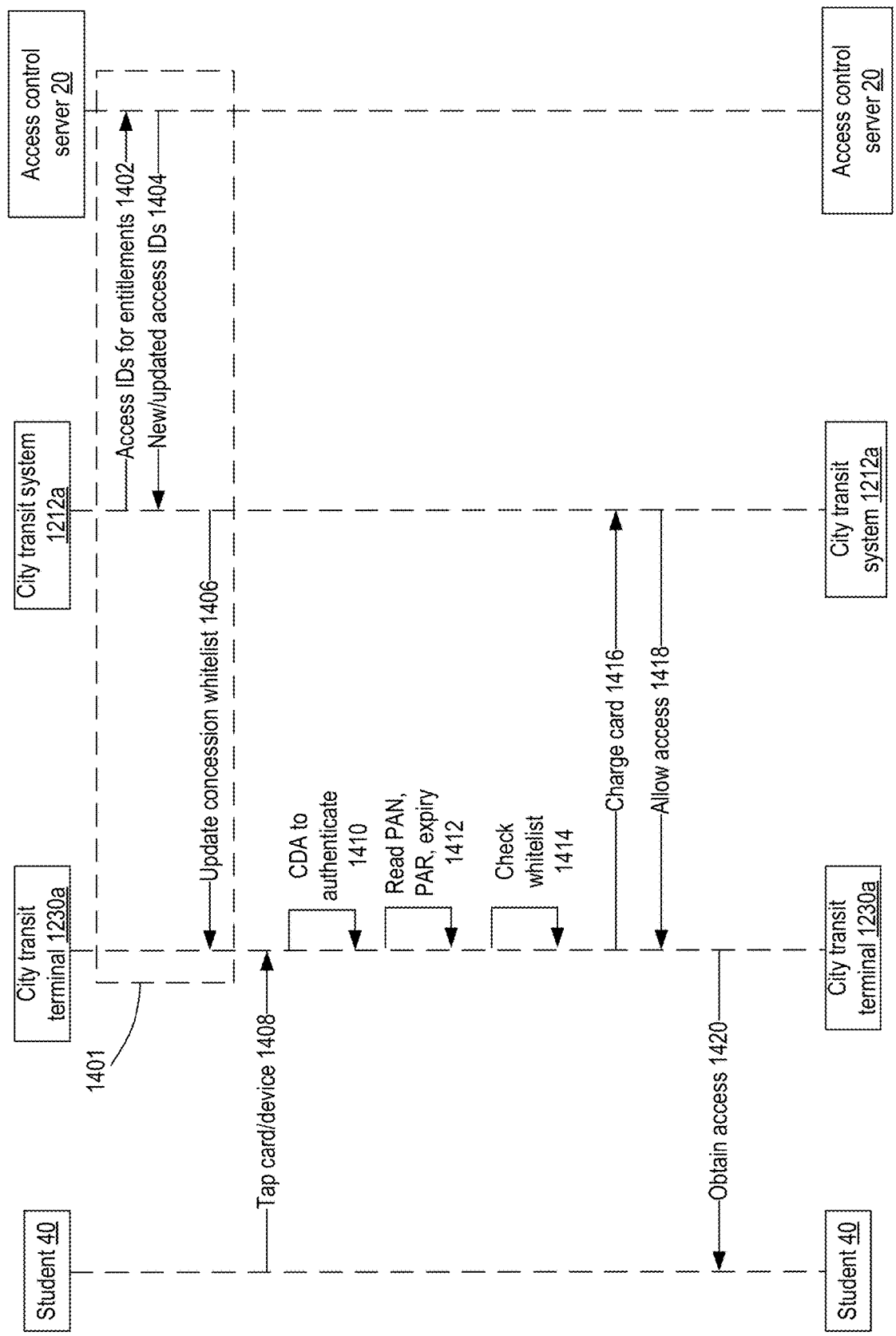
FIG. 14 is an example access flow at a transit system in the system of FIG. 12.

A swimlane diagram of steps in an example of an access control process implemented in the system 1200 is shown in FIG. 14. The process in FIG. 14 is carried out for transit system access control.

Indicated generally at 1401 is a sequence of steps which is carried out periodically to update a concession whitelist maintained by the city transit system 1212a. The steps shown at 1401 are carried out asynchronously with the access request process carried out by students 40.

At 1402, the city transit system 1212a, which is onboarded as a service provider at the access control server 20, requests a list of access profile identifiers for students who are entitled to concession rates for transit. The access control server 20 returns data comprising a list of new or updated access profile identifiers that are mapped to student IDs (1404). The data may comprise, for each such access profile identifier, a hashed PAN, a PAR corresponding to the hashed PAN, the student ID mapped to the access profile identifier, a concession rate, and a status of the card corresponding to the hashed PAN. The city transit system 1212a may then push, to city transit terminals 1230a, a concession whitelist update (1406). The concession whitelist update causes each terminal 1230a to update a locally stored whitelist that comprises a hashed PAN and PAR for each whitelisted card.

To access the transit system 1212a, a student 40 taps (1408) their student card at terminal 1230a. The student 40 may also tap another device, such as a smartphone or smart watch, which has a tokenized version of the student card provisioned thereon.

At 1410, the terminal 1230a performs a CDA process to authenticate the card, as described above. Once authenticated, the terminal 1230a reads the PAN, PAR, and expiry date of the card. In the case of a tokenized card the PAN will be a DPAN.

At 1414, the terminal 1230a checks its concession whitelist. In some embodiments, this is done by checking if the PAR appears amongst PARs in the whitelist. In other embodiments, a hashed PAN may be generated from the read PAN, and checked against the hashed PANs for the whitelisted entries.

At 1416, the student's account (linked to the PAN) is charged according to the outcome of the whitelist check. If the whitelist check is successful, the account is charged at the concession rate. If unsuccessful, it is charged at the standard rate. The charge is applied via a transaction request submitted to city transit system 1212a, which may in turn send the request to the student's issuer 330 via a payment gateway 336 (see FIG. 12).

Assuming that the transaction is successful, then at 1418 the city transit system 1212a communicates this to terminal 1230a, which activates the gantry 1232a to which it is paired, to allow the student access (1420).

Figure 15:
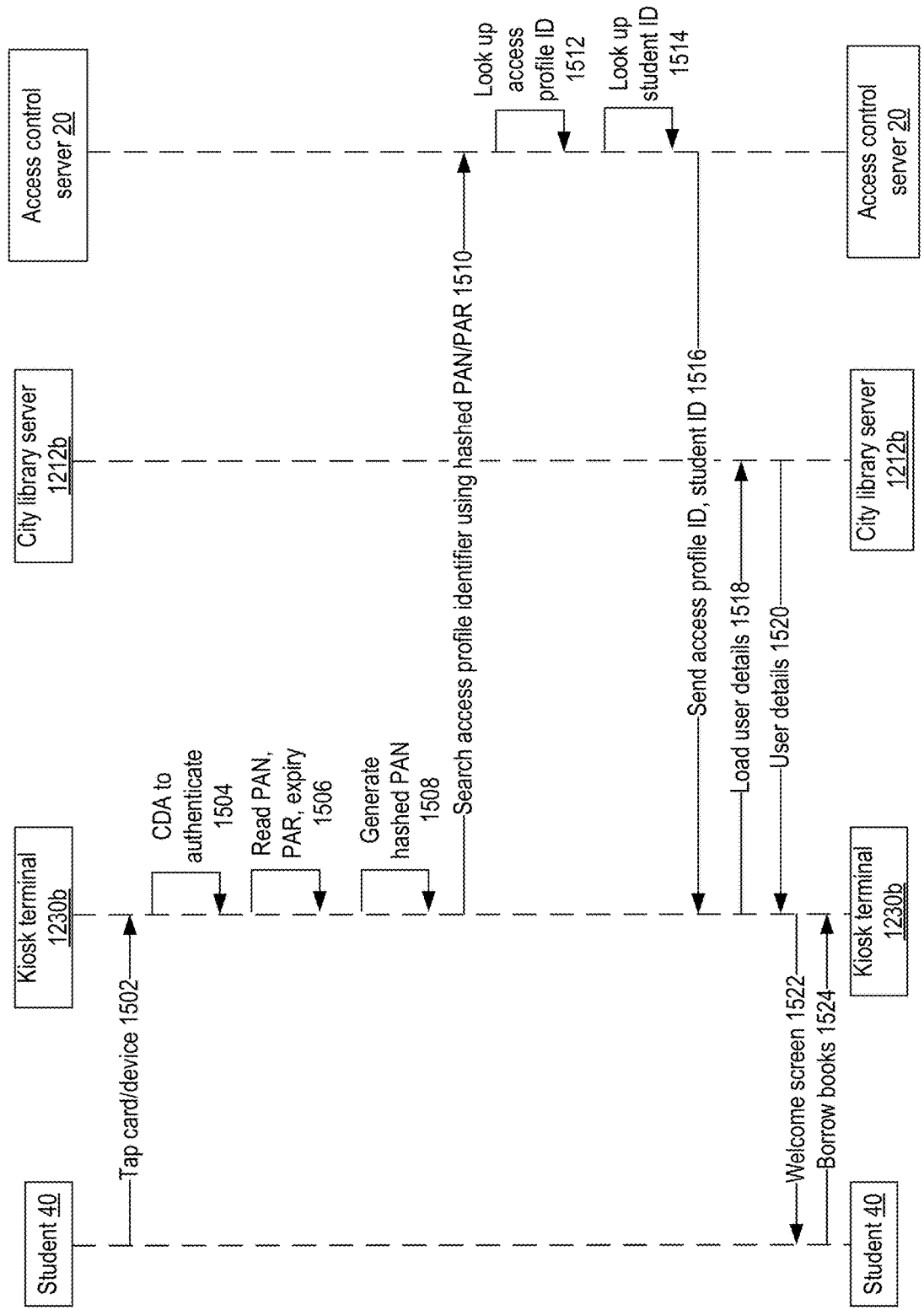
FIG. 15 is an example access flow at a library in the system of FIG. 12.

A swimlane diagram of steps in another example of an access control process implemented in the system 1200 is shown in FIG. 15. The process in FIG. 15 is carried out for library access control. In FIG. 15 it is assumed that the city library server 1212b is onboarded with access control server 20 as a service provider, and that the university central IT management system 1214 periodically sends updated student IDs and other details to the city library server 1212b so that city library server 1212b has a record of students who are permitted to access its resources (such as borrowing books and other items, or usage of computer facilities located within library premises).

At 1502, the student 40 taps their payment-enabled student card at a terminal 1230b of kiosk 1232b. As an alternative the student 40 may tap another payment-enabled device such as a smartphone or smart watch that has a tokenized version of the payment-enabled student card provisioned thereon, as above.

At 1504 the terminal 1230b authenticates the payment-enabled device by a CDA process. If authenticated, the terminal 1230b then reads the PAN (or DPAN), PAR (if available), and expiry date of the payment device, at 1506. At 1508, the terminal 1230b generates a hashed PAN (DPAN) from the PAN (DPAN) and expiry date.

Once the hashed PAN is generated, this is sent (1510) with the PAR to the access control server 20, with a request to retrieve the access profile ID and student ID corresponding to the hashed PAN and PAR. At 1512, access control server 20 may locate the access profile ID using the PAR if available, or the hashed PAN if not or if the PAR-based lookup is unsuccessful. At 1514, the access control server 20 also retrieves the student ID, based on the access profile ID.

At 1516, the access control server 20 sends the retrieved access profile ID and student ID to the kiosk 1232b (via terminal 1230b). The kiosk 1232b then sends (1518) a request to city library server 1212b to load the user details corresponding to the student ID. These are returned (1520) by city library server 1212b to kiosk 1232b. Kiosk 1232b, having validated that the holder of the payment device is a student who is permitted to access resources of the library, may then cause a welcome screen to be displayed (1522) to enable the student 40 to borrow books or other resources in the usual way (1524), at which point identifiers of the resources are associated with the student ID in the user's account.

Figure 16:
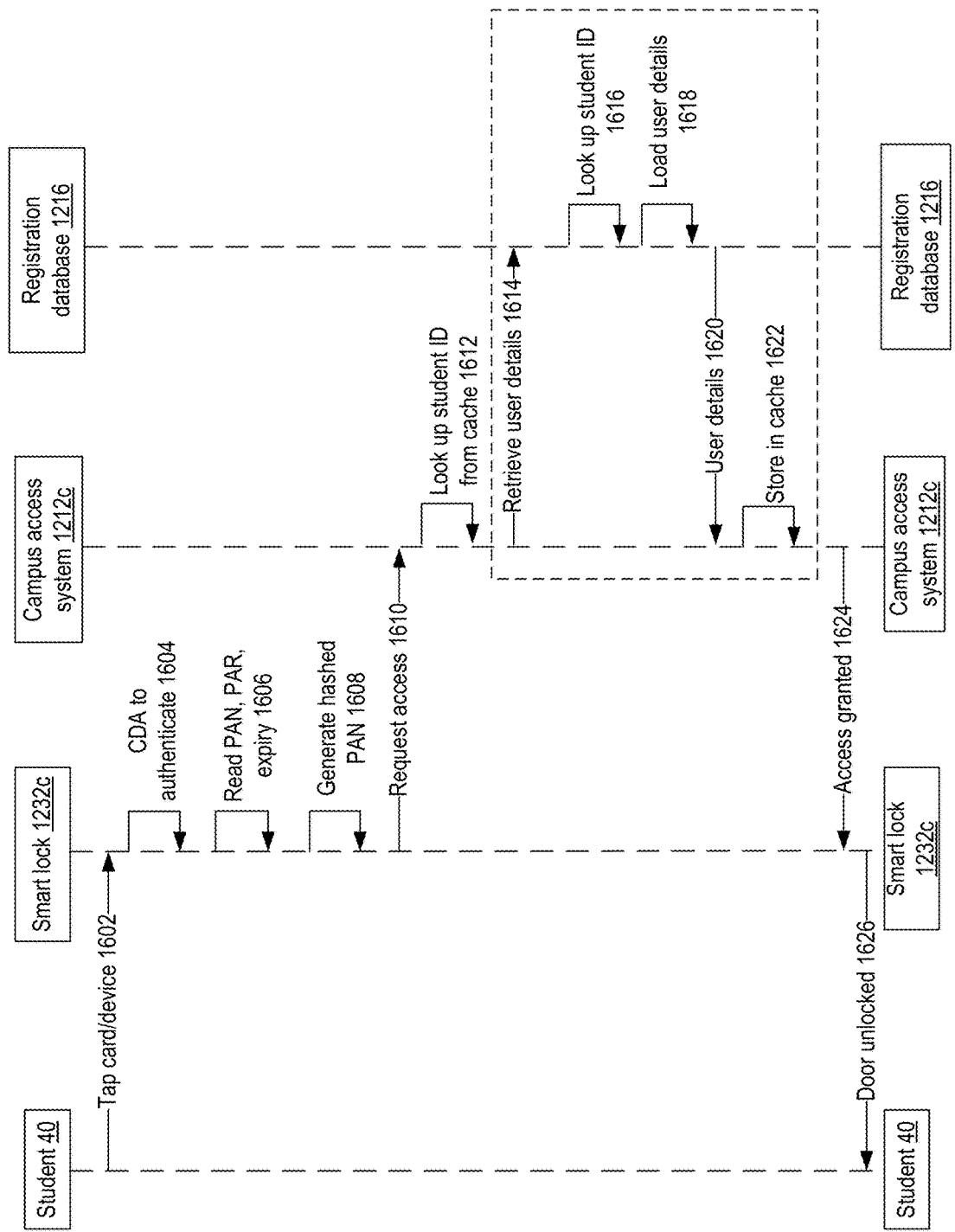
FIG. 16 is an example access flow at a smart lock of a dormitory room in the system of FIG. 12.

A swimlane diagram of steps in another example of an access control process implemented in the system 1200 is shown in FIG. 16. The process in FIG. 16 is carried out for room access control, such as access control for dormitory rooms on the campus, or for other restricted areas. In FIG. 16 it is assumed that the campus access system 1212c is onboarded with access control server 20 as a service provider, and that access control server 20 has been used to enroll the student ID so that it is associated with a hashed PAN and PAR (FIG. 13).

At 1602, the student 40 taps their payment-enabled student card at a smart lock 1232c, which comprises a terminal 1230c as shown in FIG. 12. As an alternative the student 40 may tap another payment-enabled device such as a smartphone or smart watch that has a tokenized version of the payment-enabled student card provisioned thereon, as above.

At 1604 the terminal 1230c authenticates the payment-enabled device by a CDA process. If authenticated, the terminal 1230c then reads the PAN (or DPAN), PAR (if available), and expiry date of the payment device, at 1606. At 1608, the terminal 1230b generates a hashed PAN (DPAN) from the PAN (DPAN) and expiry date.

Once the hashed PAN is generated, a room access request is sent (1610) to the campus access system 1212c. The room access request comprises a room ID for the room to which access is controlled by the smart lock 1232c, the hashed PAN, and the PAR.

At 1612, campus access system 1212c attempts to locate the student ID in an access cache for the room ID, using the PAR if available. If the PAR is not available or if the PAR-based lookup is unsuccessful, the campus access system 1212c performs the lookup using the hashed PAN.

If the student ID is not located in the access cache, optional steps 1614-1622 are performed. At 1614, the campus access system 1212c sends a lookup request to university registration database server 1216. The lookup request comprises the hashed PAN and, if available, the PAR. If the PAR is provided then at 1616, the university registration database server 1216 searches for a user access profile that matches the PAR, and returns the student ID of a matching profile. If the PAR is not provided, then the university registration database server 1216 searches for a user access profile that matches the hashed PAN, and returns the student ID of a matching profile. At 1618, user details for the student 40 are retrieved from the database 1216 using the student ID, and at 1618 the user details for the student are retrieved and sent (1620) to the campus access system 1212c. These are stored in the access cache (1622).

The campus access system 1212c, either having located the student ID in the access cache or having obtained it via the query to university registration database server 1216, has validated that the holder of the payment device is a student who is permitted to access resources of the library, and can then grant access (1624) to the smart lock 1232c associated with the room ID. This unlocks (1626) the smart lock 1232c to permit entry.

Figure 17:
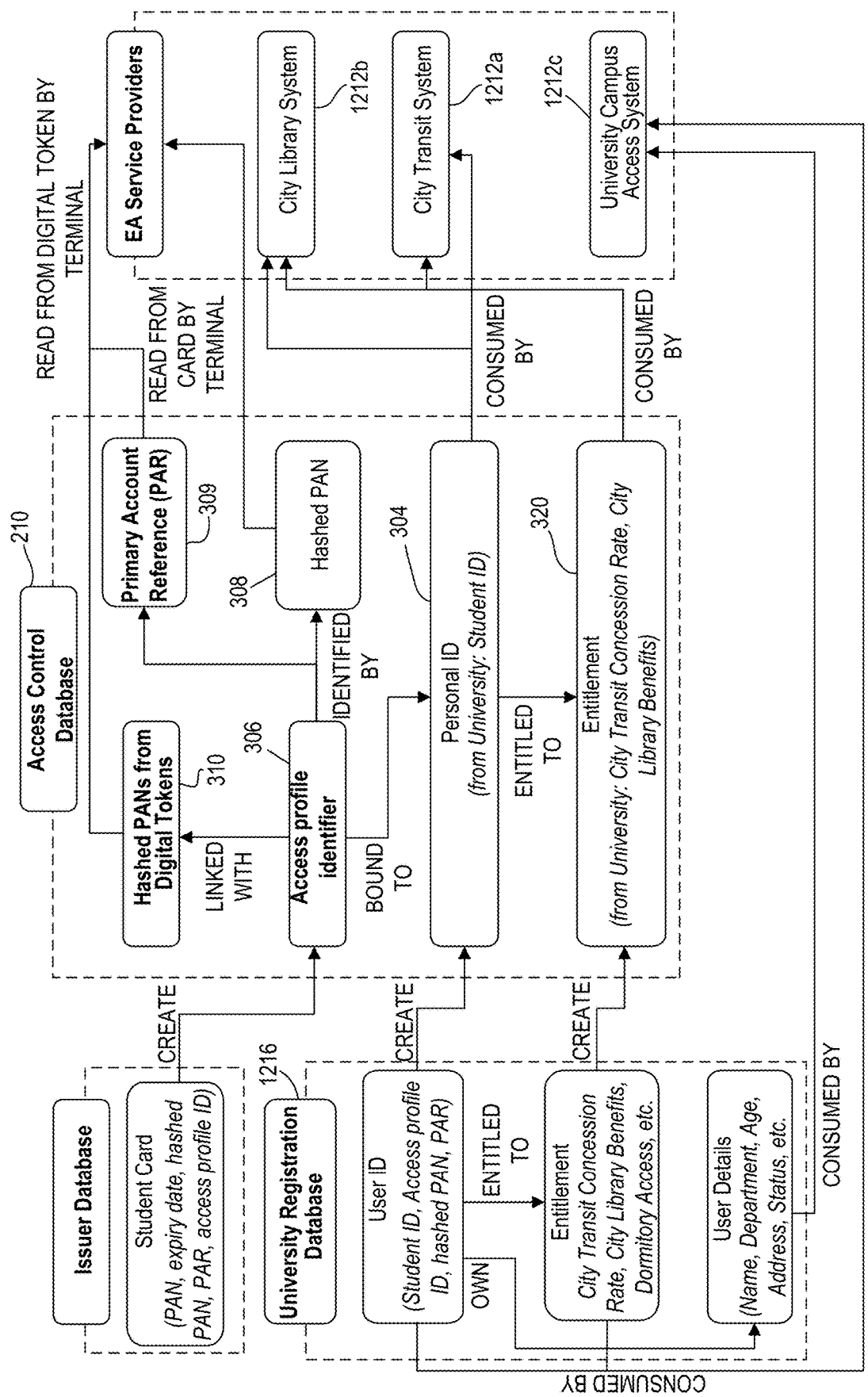
FIG. 17 is an ecosystem and data model diagram for the system of FIG. 12.

FIG. 17 shows an ecosystem and data model diagram for the system 1200 of FIG. 12. Reference numerals in FIG. 17 correspond to the equivalent entities in FIGS. 2, 3, and 12.

Figure 18:
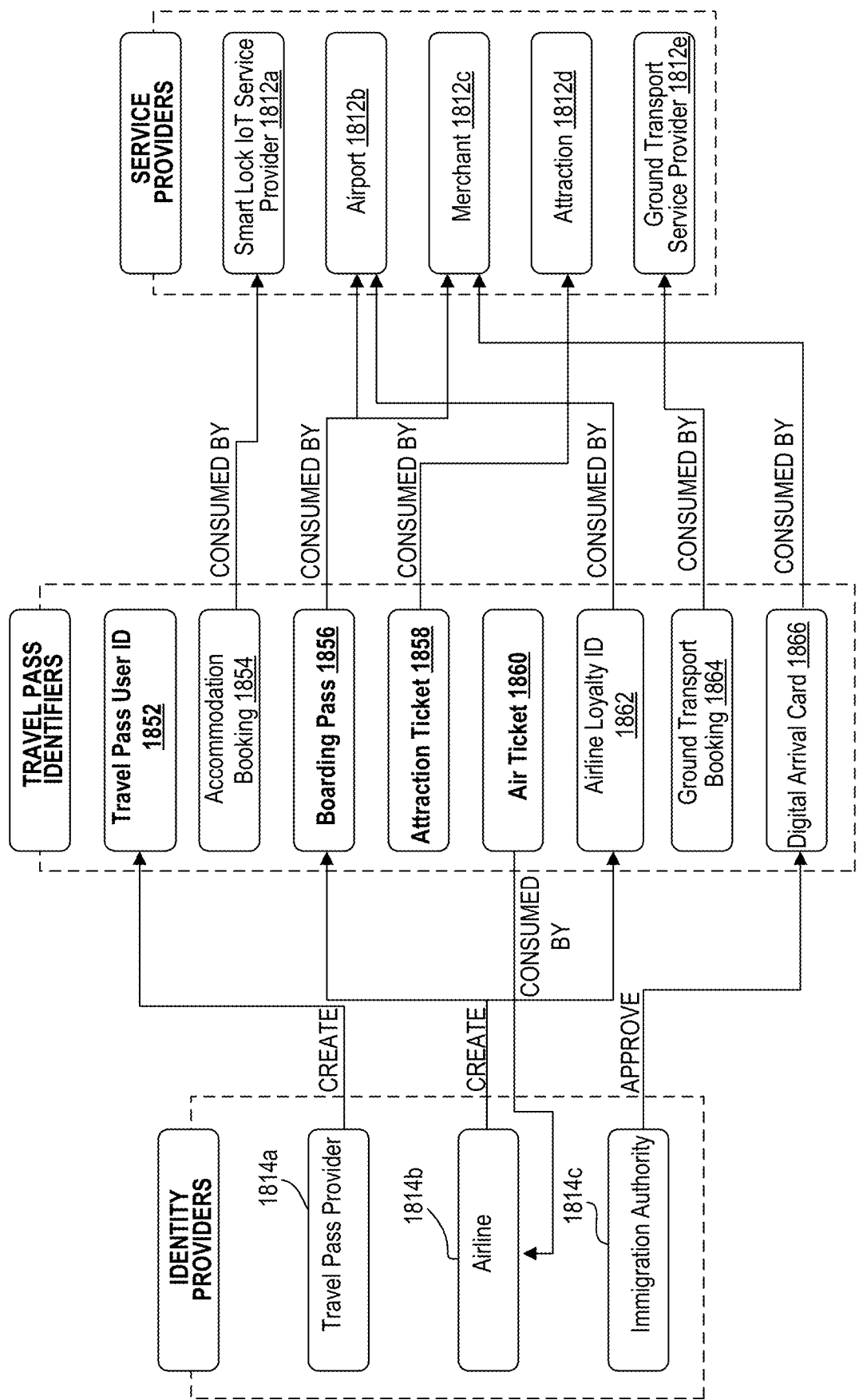
FIG. 18 is an ecosystem diagram showing the relationships between a plurality of identity providers and resources offered by a plurality of service providers in a travel ecosystem.

A further embodiment of the present disclosure will be described with reference to FIG. 18, which is an ecosystem diagram showing the relationships between a plurality of identity providers and resources offered by a plurality of service providers. FIG. 18 represents a travel ecosystem that enables a user to provide identity information (issued by the identity providers) to the plurality of service providers by presenting a contactless payment device to contactless terminals of the service providers. A system for implementing the ecosystem of FIG. 18 may have similar architecture to that shown for access control system 1200, except that there are multiple identity providers 1814a, 1814b, 1814c, each of which issues a separate personal identifier for the user. Accordingly, in this embodiment a user access profile may store a plurality of personal identifiers that are mapped to one or more payment card numbers (i.e., a many-to-one or many-to-many mapping).

Each of the identity providers 1814a, 1814b, 1814c may implement functionality similar to any of the identity providers discussed above. Similarly, each of the service providers 1812a, 1812b, 1812c, 1812d, 1812e may implement functionality similar to any of the service providers discussed above. Each of the service providers and each of the identity providers is onboarded with the access control system 20 as above. Additionally, in this embodiment, an airline 1814b may be a service provider as well as an identity provider, as will be explained below.

Figure 19:
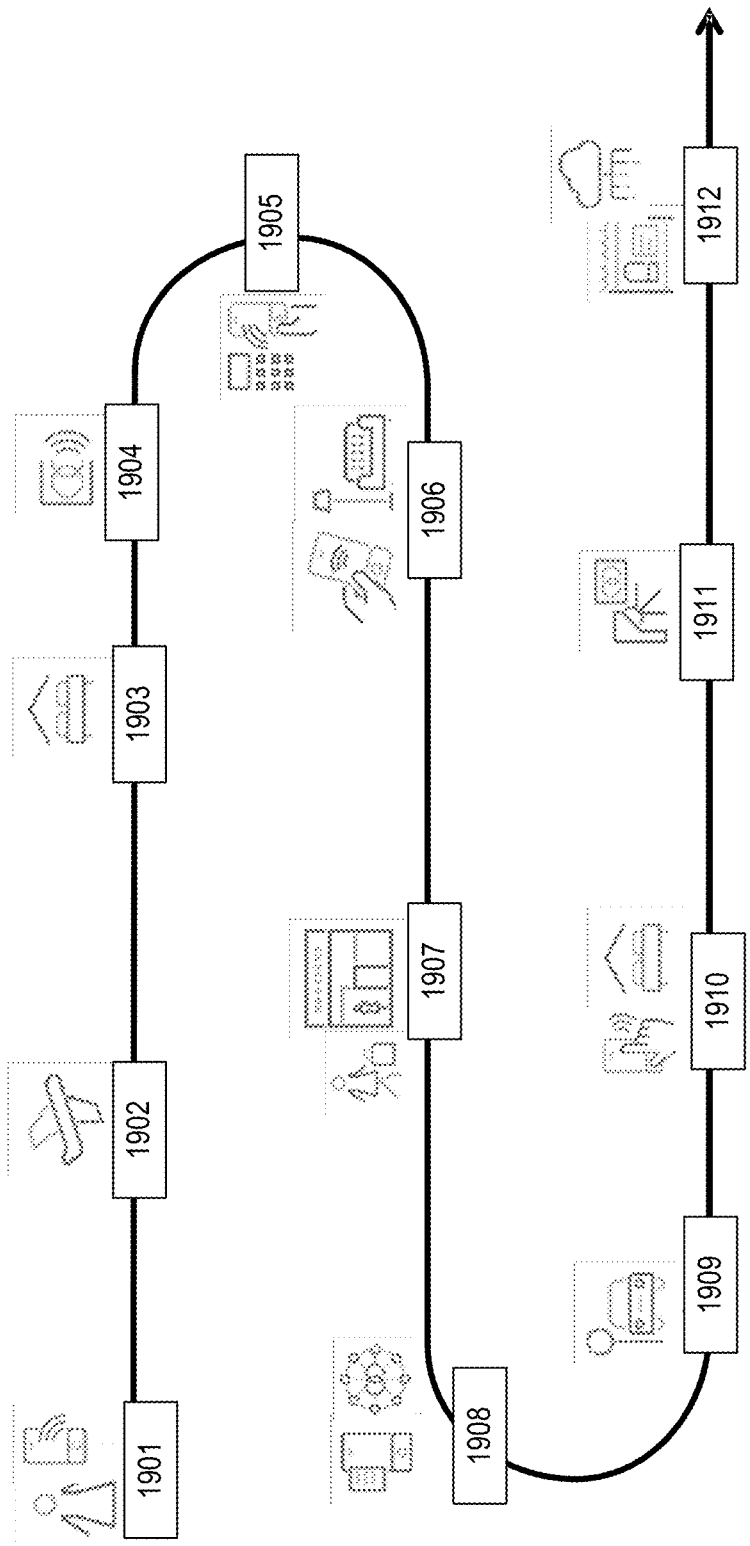
FIG. 19 shows an example of a customer journey in the travel ecosystem of FIG. 18.

With reference to FIGS. 18 and 19, an example of a customer journey in the ecosystem of FIG. 18 may be as follows.

At 1901 of FIG. 19 a user may download a mobile application of travel pass provider 1814a, register for an account with the travel pass provider 1814a, and bind a payment card to her account. This causes generation of a user access profile at access control server 20, for example in accordance with FIGS. 6 and 7. The user access profile comprises an access profile ID, a first personal identifier in the form of a travel pass user ID 1852, and a hashed PAN (and optionally a PAR) of the payment card.

At 1902, the user may book an air ticket and forward a booking confirmation email with the air ticket reference number 1860 to the travel pass provider 1814a. This may cause the travel pass provider 1814a to request the access control server 20 to bind the air ticket reference number 1860, as a second personal identifier, to the user's access profile identifier.

At 1903 the user may book accommodation with an accommodation provider. A booking confirmation email with the accommodation booking reference 1854 may be forwarded to the travel pass provider 1814a. This may cause the travel pass provider 1814a to request the access control server 20 to bind the accommodation booking reference 1854, as a third personal identifier, to the user's access profile identifier.

Other personal identifiers, such as airline loyalty ID 1862, may also be bound to the user's access profile identifier.

At 1904, at an airline check-in counter, the user taps her card or other payment-enabled device (e.g. phone) at an NFC terminal for fast check-in. Because the airline 1814b is onboarded as a service provider by access control system 20, the tapping of the card causes the NFC terminal to initiate a process similar to process 800 of FIG. 8. This enables retrieval of one or more personal identifiers of the user's access profile, such as airline loyalty ID 1862, air ticket info 1860, and passport details, for population of fields required for check-in. This results in generation of a boarding pass 1856.

At 1905, the user may tap her card or phone at a fast track airport access gantry of airport 1812b, which reads the PAN and PAR of the card or phone, and permits entry on retrieval of boarding pass 1856 based on the PAN or the PAR, in a process similar to that shown in FIG. 8.

At 1906, the user taps her card or phone at an NFC reader of an airline lounge operated by the airline 1814b (acting as service provider). The NFC reader may read the PAN and PAR of the card or phone and request retrieval of an airline loyalty ID that is in a whitelist maintained by the NFC reader. If the airline loyalty ID 1862 associated with the user's PAN/PAR is in the whitelist, the user is permitted entry into the lounge.

At 1907, the user enters a duty-free shop 1812c in the airport and taps her card or phone at a terminal of the duty-free shop 1812c. The terminal may request retrieval of a boarding pass associated with the PAN/PAR of the card or phone. On retrieval of the user's boarding pass 1856, the user is entitled to make a duty-free purchase.

At 1908, the user is preparing for arrival at her destination, and may fill in a digital arrival card 1866 in the mobile application of the travel pass provider 1814a. This may include entering passport and itinerary details, for example. At least some of the information may be pre-filled based on the binding of air ticket 1860 to the user's access profile. The user may present her card or phone to a terminal at immigration authority 1814c, which retrieves the digital arrival card 1866 based on the PAN/PAR of the card or phone, and validates the digital arrival card 1866 to enable entry. The terminal 1866 may operate a gate for this purpose.

At 1909, the user may access a ground transport service by presenting her card or phone at an NFC-enabled mobile device of a driver. The NFC-enabled mobile device may read the PAN and PAR of the card or phone, and use this to request retrieval of a ground transport booking ID 1864 previously made with the ground transport service provider 1812e. Alternatively, if the ground transport service is offered as part of the airline loyalty program, the NFC-enabled mobile device may request retrieval of the airline loyalty ID 1862 associated with the PAN/PAR in the user's access profile, and have the ground transport service provider 1812e check whether the airline loyalty ID is eligible for receiving the transport service.

At 1910, the user arrives at her accommodation, and taps her card or phone on a smart lock operated by a smart lock service provider 1812a. The smart lock service provider 1812a uses the PAN/PAR of the card or phone, as read by the smart lock, to request retrieval of the accommodation booking 1854 of the user. On successful retrieval and confirmation that the user is entitled to access the accommodation, the smart lock is opened to allow entry.

At 1911, the user may purchase an attraction ticket 1858, for example at a website of an attraction provider 1812d. The user may forward the booking confirmation to the travel pass provider 1814a, which binds the attraction ticket 1858 with the user's access profile. The user may then enter the attraction by tapping her card or phone at a gantry at an entry to the attraction. A NFC terminal at the gantry reads the PAN and PAR of the card or phone, and requests retrieval of an attraction ticket based on the PAN/PAR. On successful retrieval of attraction ticket 1858, the gantry is opened.

At 1912, the user may present her card or phone at a city duty-free shop, depicted in FIG. 18 as merchant 1812c, to demonstrate entitlement to a tax refund. A terminal of the merchant 1812c requests retrieval of an air ticket associated with the PAN/PAR read from the card or phone. On retrieval of air ticket 1860, a tax refund may be initiated, with reimbursement made to the card that was tapped at the terminal.

A further embodiment will now be described with reference to FIGS. 20 to 23, which depict processes in an access control and ID verification system 2000 that is based on health status. The processes may involve enrolment and use of a "health pass" issued by an official authority such as a government agency. The health pass may be indicative of recovery from, or vaccination against, an infectious disease, for example. Individuals in possession of the health pass may be able to get safely back to work (in particular those in frontline positions in hospitals or retail), access shopping malls, or travel by train or plane.

Figure 20:
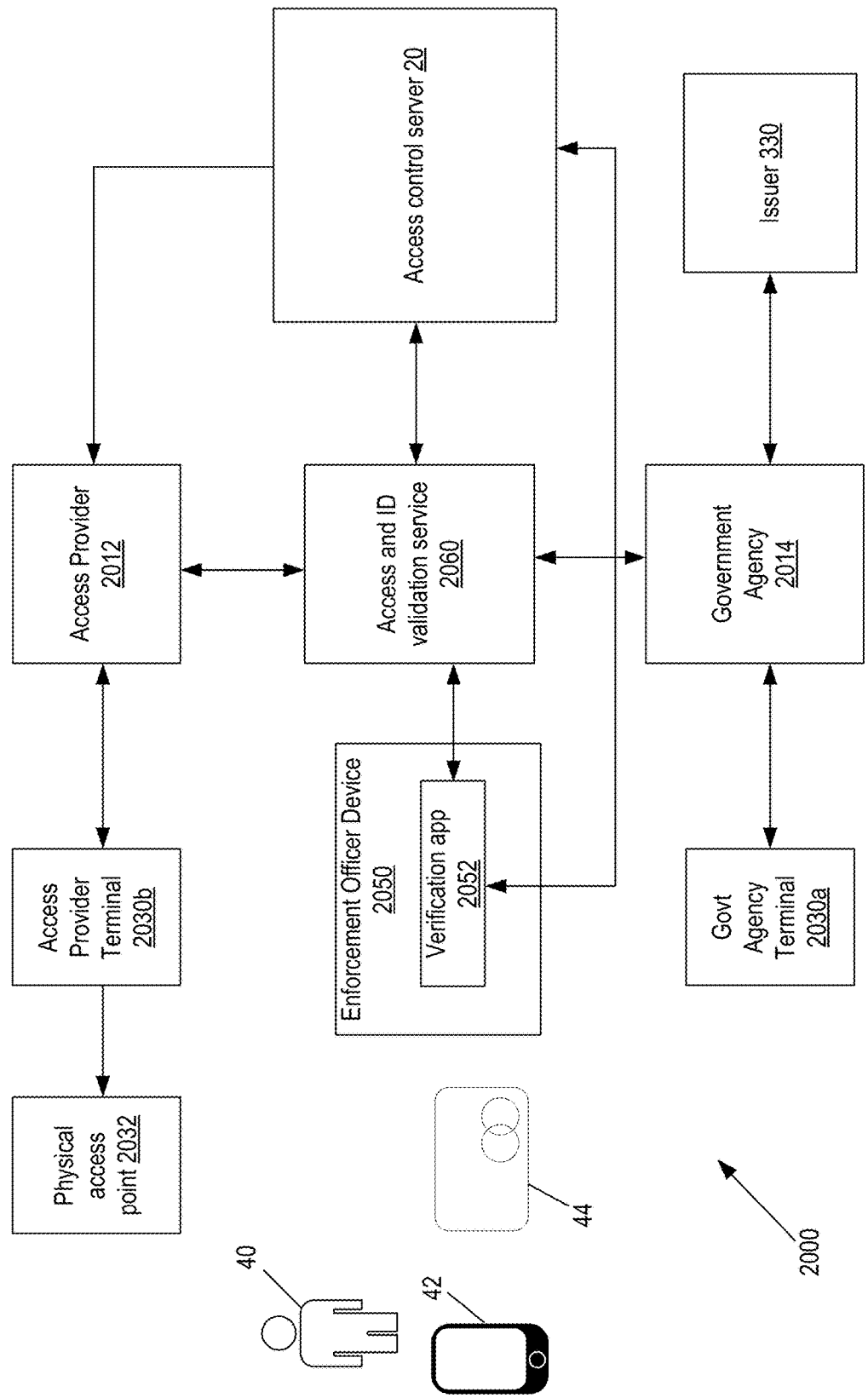
FIG. 20 is an example system architecture of an access control and identity validation system where access is based on health status.

FIG. 20 is a system architecture diagram of an example access control system 2000. The access control system 2000 comprises an access control server 20 that is in communication with at least one access provider system 2012. The access provider system 2012 may be a transit system, a system of a shopping mall or other retail facility, or a system of an entity such as a hospital or other healthcare facility. The access provider system 2012 may control a physical access point 2032 which is accessed by a user 40. The user 40 may use a payment device such as a payment card 44 or a payment-enabled computing device such as a smartphone 42 to interact with terminal 2030b that is in communication with the physical access point 32. The interaction between a payment card 44 and the terminal 2030b may be either contactless (e.g. NFC) or may involve the user 40 dipping the payment card 44 into a card reader slot of the terminal 2030b; for a smartphone 42 or other device with a non-card form factor, the interaction is contactless only.

The terminal 2030b is operable to control a physical actuation mechanism of the physical access point 32 to enable access. For example, the physical access point 2032b may comprise a gantry or automatic door that is unlocked and/or actuated on successful usage of the payment device 42 or 44 at the terminal 2030b.

Access control server 20 is also in communication with an identity provider system that is a government agency system 2014. The government agency system 2014 enables users 40 to obtain a personal identifier (health pass identifier) that confirms their health status and to enroll this with access control server 20 to that it becomes part of their access profile 220, and thus associated with one or more payment identifiers of payment devices 42 or 44 which they own. Enrollment may be achieved by interaction with a government agency terminal 2030a that is in communication with the government agency system 2014.

The system 2000 also comprises an access and ID validation service 2060 in communication with the access control server 20. The access and ID validation service 2060 is further in communication with government agency system 2014 to facilitate creation of health passes. The access and ID validation service 2060 is also in communication with user devices 2050 of authorized officers, such as enforcement officers, to enable the authorized officers to verify the identity and health status of users 40.

Figure 21:
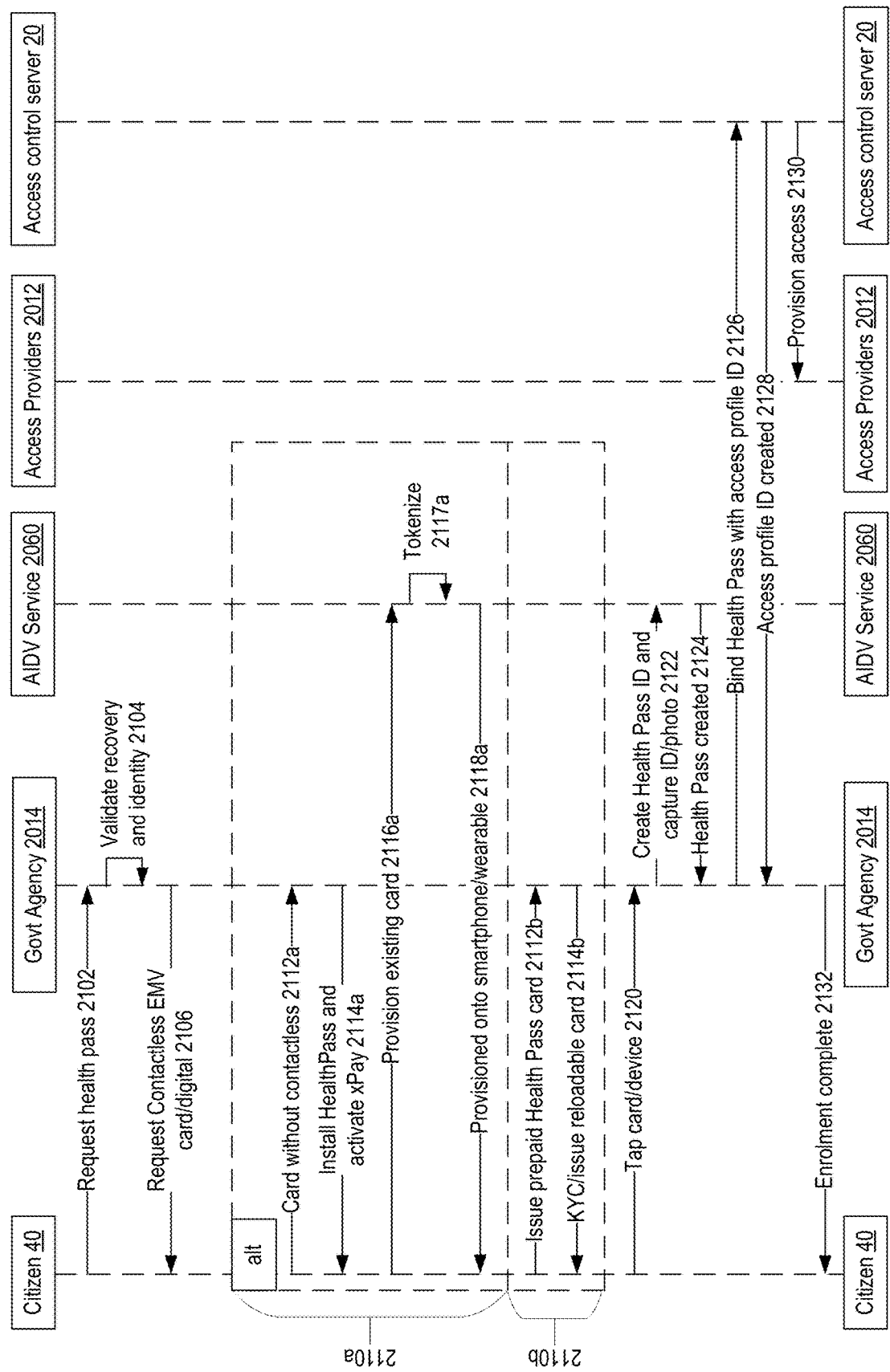
FIG. 21 is an example enrollment flow in the system of FIG. 20.

Referring to FIG. 21, to enroll for a health pass, a user 40 may provide a request (2102) to government agency system 2014. The government agency system 2014 may be a system of a government health department, for example. The request may be made via the government agency terminal 2030a, and may comprise a personal identifier such as a national ID, and other personal information of the user 40 such as full name, date of birth and the like. In addition, if the government agency system 2014 stores biometric data of the user 40 such as fingerprint or facial biometric data, and the terminal 2030a has a suitable biometric reader for capturing such data, this may be read by the terminal 2030a and transmitted to government agency system 2014.

On receipt of the request, at 2104 the government agency system 2104 may validate the identity of the user 40 using the provided personal information, and may also confirm their health status (e.g., recovered from infectious disease and/or vaccinated against the infectious disease).

At 2106, the government agency system 2014 requests the user 40 to provide details of a contactless payment device to be bound to the health pass.

Optionally, if the user 40 does not have an existing contactless payment device, then a suitable payment device may be provisioned in two different ways.

In a first alternative, in a series of steps shown at 2110a, the user 40 may first provide details of a card which does not have contactless capability (2112a). Next, at 2114a, the government agency system 2014 may prompt the user 40 to install a HealthPass application on their mobile device (e.g. smartphone, smart watch or other wearable) 42, and to activate a wallet application, such as Apple Pay or Google Pay, on the mobile device 42. At 2116a the user 40 requests provisioning of their existing non-contactless card and this request is transmitted to access and ID verification (AIDV) service 2060. The request comprises card data that comprises the PAN, expiry date, and CVC of the non-contactless card. The AIDV service 2060 requests tokenization (2117a) of the non-contactless card using the card data. The tokenization request may be sent directly to a tokenization service, such as tokenization service 22 of FIG. 1, or to an issuer of the card, such as issuer 330 of FIG. 1. When the token is received from the issuer 330 or tokenization service 22, this is transmitted (2118a) to the user's 40 device 42 for provisioning onto the device 42.

In a second alternative, which comprises steps shown at 2110b, the user 40 may not have a suitable mobile device 42 for provisioning of a token. Instead, the user 40 may submit a request (2112b) to the government agency system 2014 to issue a dedicated Health Pass card that is a contactless prepaid card. The prepaid card can be used for standard payment transactions as well as for identification purposes in the access control and identification system 2000. The government system 2014 then requests (2114b) user 40 to fill in information that is required for know-your-customer (KYC) purposes, and once this is received, transmits a request to an issuer 330 to issue the contactless prepaid card in accordance with the user details.

Once the user 40 is in possession of a contactless payment device, this can be tapped at terminal 2030a of the government agency system 2014 to continue the enrollment process. The government agency system 2014 sends a request (2122) to the AIDV service 2060 to create a health pass identifier. The request may also comprise identification information and a photo for storage at the AIDV service 2060 in association with the health pass identifier. The health pass identifier, once created, is sent back (2124) to the government agency 2014.

At 2126, the government agency system sends a request to the access control server 20 to bind the health pass identifier to the user's access profile identifier, i.e. to incorporate the health pass identifier into the access profile as a personal identifier. The request comprises the hashed PAN (or DPAN) and PAR of the contactless payment device, and the health pass identifier. The access control server 20 may check whether the hashed PAN(DPAN)/PAR is already associated with an access profile. If so, the access profile may updated with the health pass identifier as a personal identifier. Otherwise, an access profile with corresponding access profile identifier may be created, and the health pass identifier added to the access profile in association with the hashed PAN(DPAN) of the contactless payment device.

At 2128, the access profile identifier is sent back to the government agency system 2014 and at the same time, the access service provider 20 pushes (2130) the access profile identifier to access providers 2012. At 2132, confirmation of enrollment is conveyed to the user 40 by the government agency system 2014.

Figure 22:
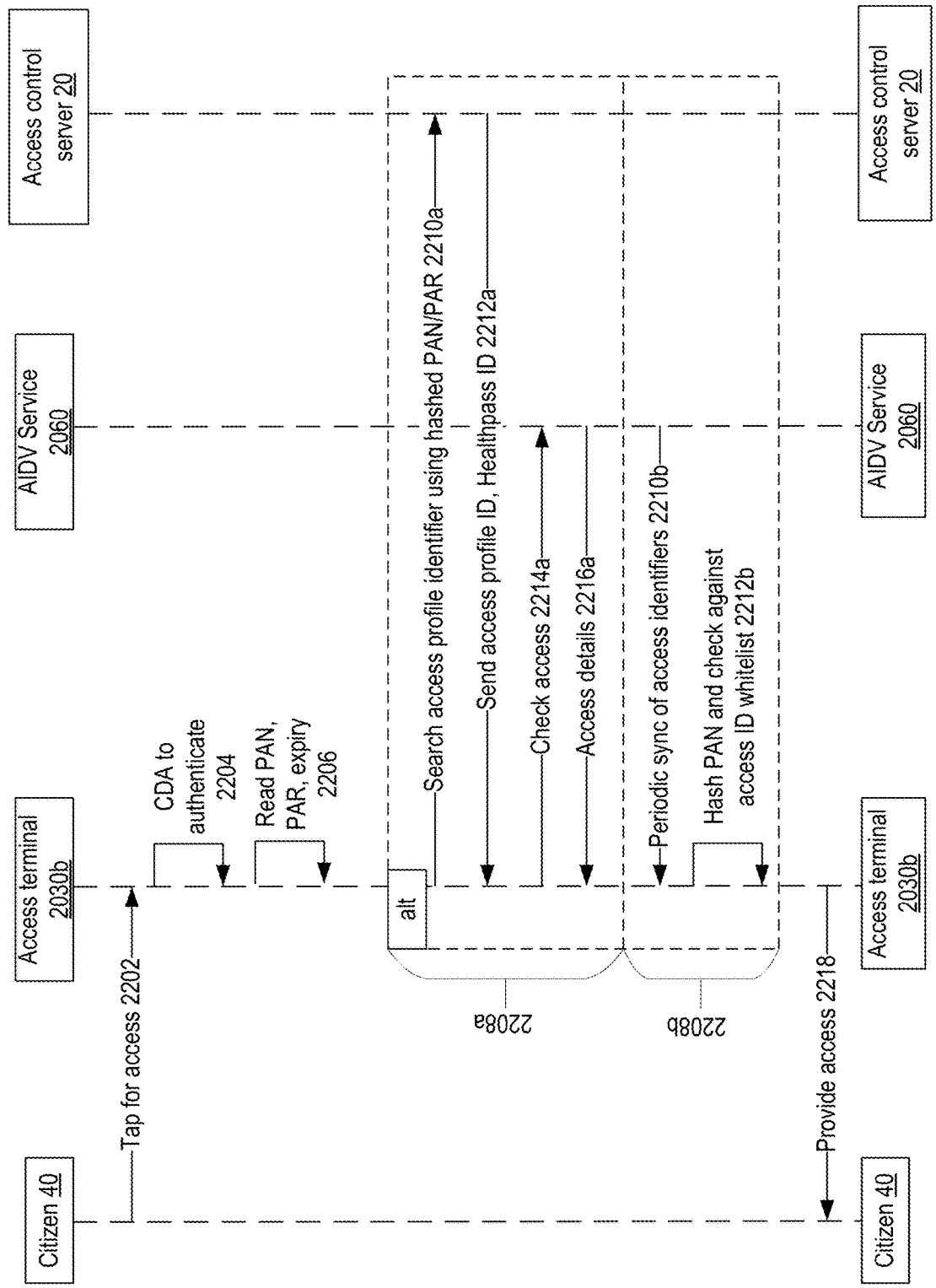
FIG. 22 is an example access flow in the system of FIG. 20.

FIG. 22 is an example flow of an access process at an access terminal 2030b of an access provider 2012. The user 40 taps (2202) their contactless payment device at the access terminal 2030b. This may be the same contactless payment device that was used for enrollment, or may be another contactless payment device that is bound to the same PAR, as discussed above. At 2204 the access terminal 2030b performs a CDA to authenticate the contactless payment device and once authenticated, at 2206 the access terminal 2030b reads the PAN (or DPAN), PAR (if available), and expiry date of the payment device.

Next, the access terminal 2030b may perform one of two alternative access request flows, shown as 2208a and 2208b respectively in FIG. 22.

In alternative 2208a, the access terminal 2030b hashes the PAN (DPAN) and sends this with the PAR (if available) to access control server 20 to search for a matching access profile. Assuming this is found, the corresponding access profile identifier and health pass identifier are sent back to the access terminal 2030b. The access terminal 2030b then contacts (2214a) the AIDV 2060, using the health pass identifier, to confirm that it exists and is valid. The AIDV 2060 then returns (2216a) the confirmation to the access terminal 2030b, and access is provided at 2218 (for example, by activating physical access point 2032).

In alternative 2208b, the AIDV service 2060 periodically synchronizes (2210b) access profile identifiers that are associated with a valid health pass identifier, with a whitelist held at access terminal 2030b. The whitelist may contain hashed PANs that are associated with the access profile identifiers. To check whether the tapped contactless payment device is held by a user 40 that is permitted access, the terminal 2030b may hash the PAN (DPAN) read from the card, and compare this against the whitelist. If present in the whitelist, access is permitted at 2218.

Figure 23:
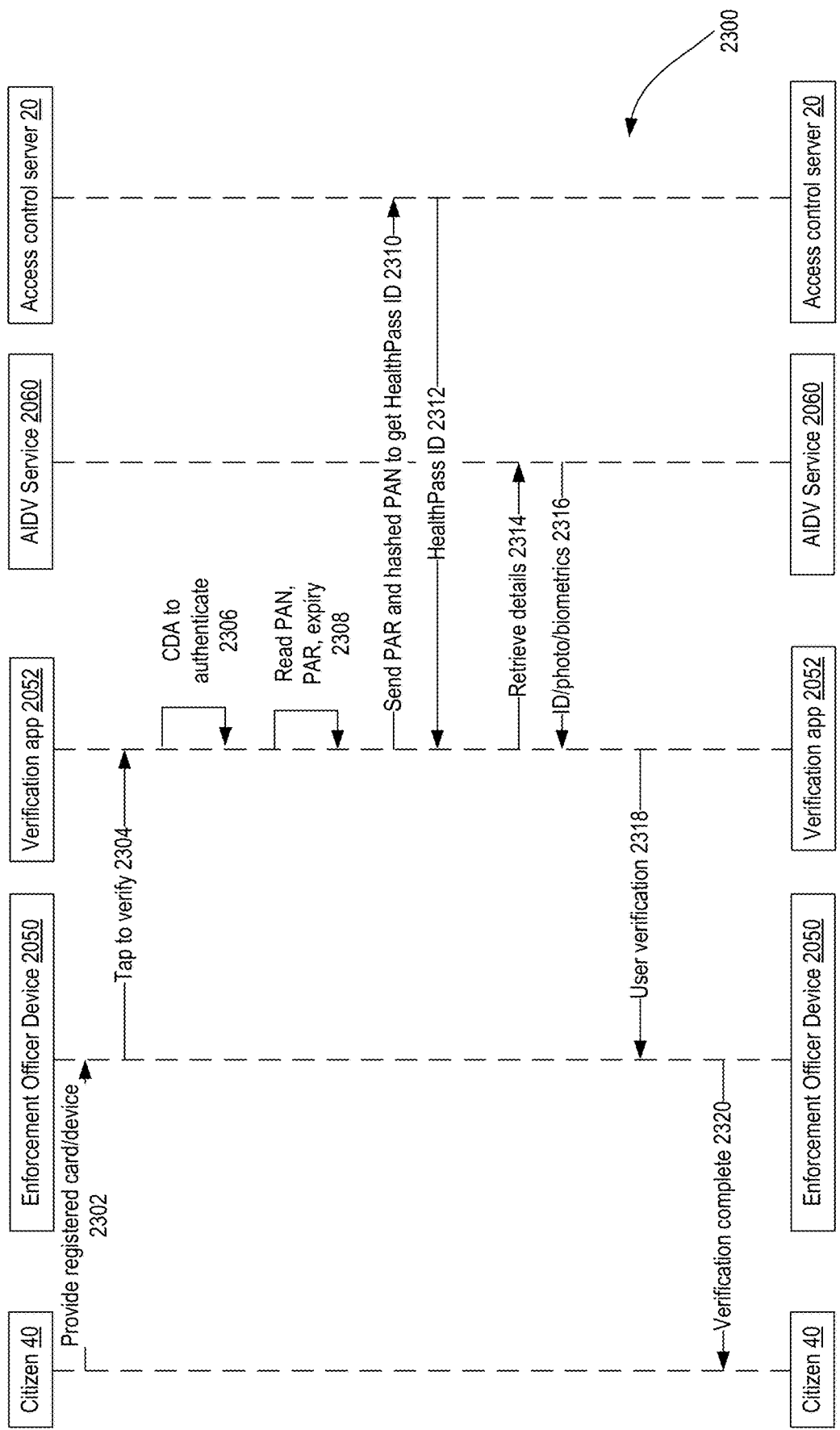
FIG. 23 is an example identity validation flow in the system of FIG. 20.

FIG. 23 shows a flow of a user identification and verification process 2300 in the system 2000. The process 2300 commences with user 40 providing (2302) their enrolled contactless payment device to an enforcement officer who taps the device at their mobile device 2050. Mobile device 2050 has a verification app 2052 installed thereon. Mobile device 2050 also comprises an EMV kernel that is used by the verification app 2052 to perform certain EMV-related processes including a CDA process 2306 to validate the payment device, and reading (2308) the PAN, PAR, and expiry date of the payment device. The verification app 2052 also generates a hash of the PAN (or DPAN) and sends this (2310) with the PAR to the access control server 20 to perform a lookup of the user 40's health pass identifier. When the access profile matching the user's hashed PAN or PAR is located, the corresponding access profile identifier and health pass identifier are returned (2312) to the verification app 2052.

The verification app 2052 then requests (2314) the AIDV service 2060 to provide details of the user 40 that were associated with the health pass identifier during enrollment. The details may comprise the user's name and date of birth, and their photo. Once retrieved, the details are provided (2316) to the verification app 2052 and can be displayed on the enforcement officer's device 2050. The enforcement officer can then manually verify (2318) the user 40, and verification is completed (2320).

Figure 24:
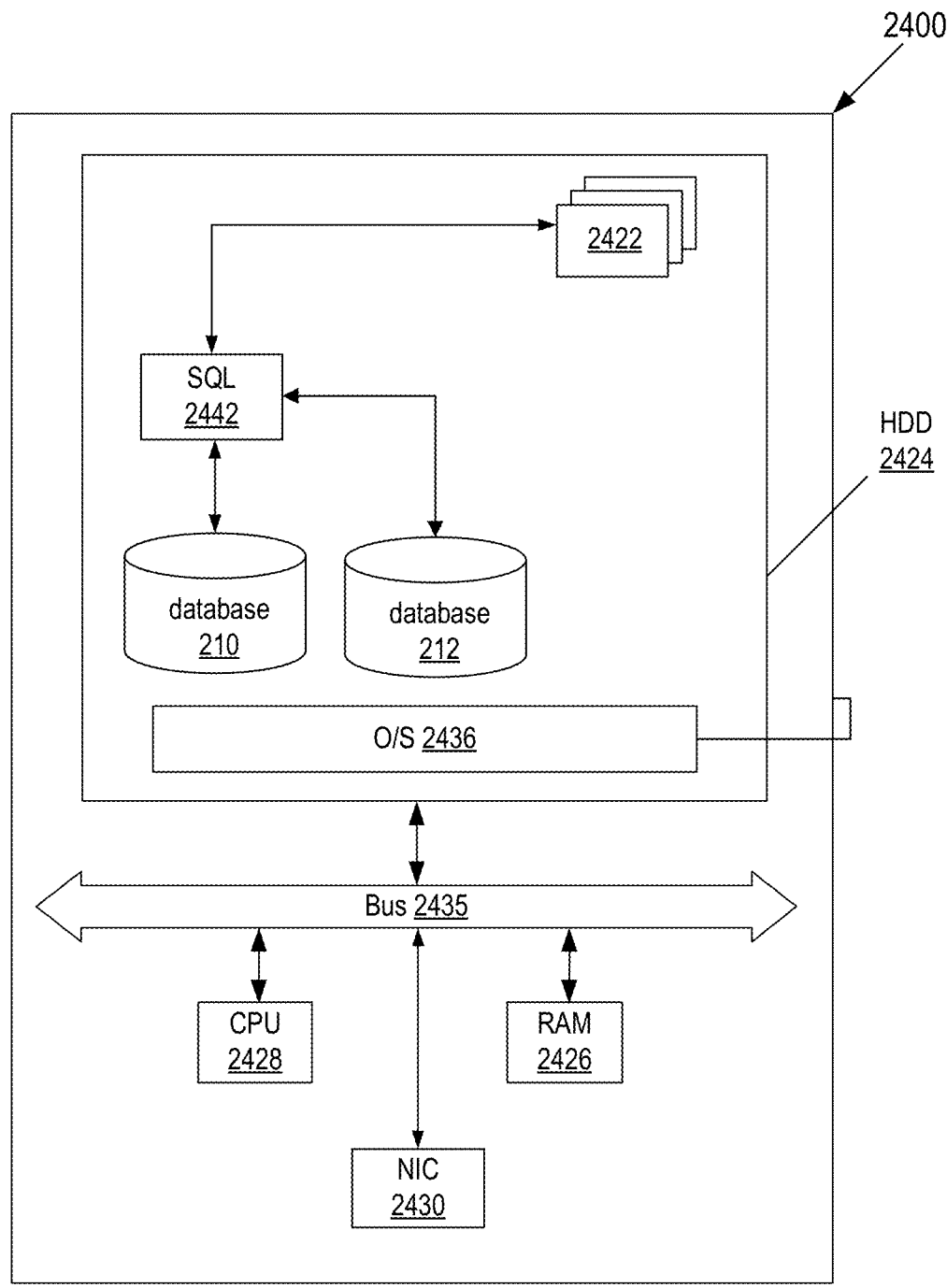
FIG. 24 is an example block architecture of one possible form of an access control server.

FIG. 24 shows an example computing device 2400 that is capable of implementing an access control server 20. In some embodiments, multiple computing devices 2400 may be considered to be a single access control server 20.

The components of the computing device 2400 can be configured in a variety of ways. The components can be implemented entirely by software to be executed on standard computer server hardware, which may comprise one hardware unit or different computer hardware units distributed over various locations, which may communicate over a network. Some of the components or parts thereof may also be implemented by application specific integrated circuits (ASICs) or field programmable gate arrays.

In the example shown in FIG. 24, the computing device 2400 is a commercially available server computer system based on a 32 bit or a 64 bit Intel architecture, and the processes and/or methods executed or performed by the computing device 2400 are implemented in the form of programming instructions of one or more software components or modules 2422 stored on non-volatile (e.g., hard disk) computer-readable storage 2424 associated with the computing device 2400. At least parts of the software modules 2422 could alternatively be implemented as one or more dedicated hardware components, such as application-specific integrated circuits (ASICs) and/or field programmable gate arrays (FPGAs).

The computing device 2400 comprises at least one or more of the following standard, commercially available, computer components, all interconnected by a bus 2435:

(a) random access memory (RAM) 2426;
(b) at least one computer processor 2428, and
(c) a network interface connector (NIC) 2430 which connects the computer device 900 to a data communications network and/or to external devices.

The computing device 2400 comprises a plurality of standard software modules, comprising:

(a) an operating system (OS) 2436 (e.g., Linux or Microsoft Windows); and
(b) structured query language (SQL) modules 2442 (e.g., MySQL, available from http://www.mysql.com), which allow data to be stored in and retrieved/accessed from SQL databases 210 and 212.

The databases 210 and 212 may form part of the computer readable data storage 2424. Alternatively, the databases 210 and 212 may be located remote from the computing device 24 shown in FIG. 24.

The boundaries between the modules and components in the software modules 2422 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of those parts of the processes described herein as being performed by the access control server 20 may be executed by a module (of software modules 2422) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

The computing device 2400 normally processes information according to a program (a list of internally stored instructions such as a particular application program and/or an operating system) and produces resultant output information via input/output (I/O) devices 2430. A computer process typically comprises an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

The invention claimed is:

1. An access control method comprising:
providing, by an access control server, access profiles for users, wherein each access profile comprises an access profile identifier and at least one personal identifier mapped to one or more obfuscated payment numbers, wherein each of the at least one personal identifier is a non-payment identifier issued by an identity provider system;
receiving, by the access control server from a terminal of a service provider system, a request to validate permission for a user of a payment device to access a resource made available by the service provider system, the request comprising an obfuscated payment number read by the terminal from the payment device;

determining, by the access control server, a first match or an un-match of the obfuscated payment number read by the terminal and the one or more obfuscated payment numbers corresponding to a respective access profile of the access profiles;

in response to the first match, transmitting, by the access control server, a respective access profile identifier and at least one respective personal identifier of the respective access profile to the service provider system for matching to a stored identifier associated with the resource; and in response to the un-match of the obfuscated payment number:

performing a primary account reference (PAR) inquiry using a PAR associated with the obfuscated payment number read by the terminal to retrieve a list of payment numbers associated with the PAR;

generating one or more second obfuscated payment numbers from the list of payment numbers; and determining a second match of the one or more second obfuscated payment numbers and the one or more obfuscated payment numbers of the access profiles.

2. The method of claim 1, wherein the request from the terminal includes information identifying the identity provider system that issued the personal identifier.

3. The method of claim 1, further comprising:

receiving, from the terminal of the service provider system, the PAR associated with the obfuscated payment number read by the terminal.

4. The method of claim 3, wherein, in response to the un-match of the obfuscated payment number, the method further comprises:

in response to the second match, transmitting the personal identifier of the matched access profile to the service provider system for matching to a stored personal identifier associated with a respective resource.

5. The method of claim 1, wherein the obfuscated payment number is an obfuscated PAN or an obfuscated tokenized PAN (DPAN).

6. The method of claim 5, wherein the obfuscated PAN is generated by computing a hash of data that comprises the PAN, or wherein the obfuscated DPAN is generated by computing a hash of data that comprises the DPAN.

7. The method of claim 1, wherein access to the resource comprises one of: opening a door, gate, or gantry to enable access to a physical environment;

causing vending of one or more products; or unlocking a vehicle or an appliance.

8. The method of claim 1, wherein each of the at least one personal identifier comprises one of: a national ID, driver's license number, social security number, passport number, tax identification number, student number, health status identifier, or loyalty ID.

9. A server for secure access control comprising:

a data storage unit configured to store access profiles for users, wherein each access profile comprises an access profile identifier and at least one personal identifier mapped to one or more obfuscated payment numbers, wherein each of the at least one personal identifier is a non-payment identifier issued by an identity provider system; and an access validation module configured to:

receive, from a terminal of a service provider, a request to validate permission for a user of a payment device to access a resource made available by the service provider system, wherein the request comprises an obfuscated payment number read by the terminal from the payment device;

determine, by querying the data storage unit, a first match or an un-match of the obfuscated payment number read by the terminal and the one or more obfuscated payment numbers corresponding to a respective access profile of the access profiles;

in response to the first match, transmit a respective access profile identifier and at least one respective personal identifier of the respective access profile to the service provider for matching to a stored identifier associated with the resource; and in response to the un-match of the obfuscated payment number:

perform a primary account reference (PAR) inquiry using a PAR associated with the obfuscated payment number read by the terminal to retrieve a list of payment numbers associated with the PAR;

generate one or more second obfuscated payment numbers from the list of payment numbers; and determine a second match of the one or more second obfuscated payment numbers and the one or more obfuscated payment numbers of the access profiles.

10. The server of claim 9, wherein the request from the terminal includes information identifying the identity provider system that issued the personal identifier.

11. The server of claim 9, wherein the access validation module is further configured to receive, from the terminal of the service provider system, the PAR associated with the payment number read by the terminal.

12. The server of claim 11, wherein in response to the un-match of the obfuscated payment number, the access validation module is further configured to:

in response to the second match, transmit the personal identifier of the matched access profile to the service provider system for matching to a stored personal identifier associated with a respective resource.

13. The server of claim 9, wherein the obfuscated payment number is an obfuscated PAN or an obfuscated tokenized PAN (DPAN).

14. The server of claim 13, wherein the access validation module is further configured to generate the obfuscated PAN by computing a hash of data that comprises the PAN, or to generate the obfuscated DPAN by computing a hash of data that comprises the DPAN.

15. The server of claim 9, wherein access to the resource comprises one of: opening a door, gate, or gantry to enable access to a physical environment; causing vending of one or more products; or unlocking a vehicle or an appliance.

16. The server of claim 9, wherein each of the at least one personal identifiers comprises one of: a national ID, driver's license number, social security number, passport number, tax identification number, student number, health status identifier, or loyalty ID.

17. A non-transitory computer-readable storage medium having stored thereon instructions for causing at least one processor to:

provide, by an access control server, access profiles for users, wherein each access profile comprises an access profile identifier and at least one personal identifier mapped to one or more obfuscated payment numbers, wherein each of the at least one personal identifier is a non-payment identifier issued by an identity provider system;

receive, by the access control server from a terminal of a service provider system, a request to validate permission for a user of a payment device to access a resource made available by the service provider system, the request comprising an obfuscated payment number read by the terminal from the payment device;

determine, by the access control server, a first match or an un-match of the obfuscated payment number read by the terminal and the one or more obfuscated payment numbers corresponding to a respective access profile of the access profiles;

in response to the first match, transmit, by the access control server, a respective the access profile identifier and at least one respective personal identifier of the respective access profile to the service provider system for matching to a stored identifier associated with the resource; and in response to the un-match of the obfuscated payment number:
  perform a primary account reference (PAR) inquiry using a PAR associated with the obfuscated payment number read by the terminal to retrieve a list of payment numbers associated with the PAR;
  generate one or more second obfuscated payment numbers from the list of payment numbers; and
  determine a second match of the one or more second obfuscated payment numbers and the one or more obfuscated payment numbers of the access profiles.

\* \* \* \* \*